United States Patent [19]

Yokoyama et al.

[11] Patent Number: 5,069,967

[45] Date of Patent: Dec. 3, 1991

[54] MAGNETIC RECORDING MEDIUM

[75] Inventors: Kenji Yokoyama; Masatoshi Nakayama; Toru Shimozawa; Kunihiro Ueda; Fumio Maruta, all of Nagano, Japan

[73] Assignee: TDK Corporation, Tokyo, Japan

[21] Appl. No.: 387,827

[22] Filed: Aug. 1, 1989

Related U.S. Application Data

[62] Division of Ser. No. 46,317, May 6, 1987, Pat. No. 4,880,687.

[30] Foreign Application Priority Data

| May 9, 1986 | [JP] | Japan | 61-106148 |
| May 9, 1986 | [JP] | Japan | 61-106149 |
| May 9, 1986 | [JP] | Japan | 61-106150 |
| May 9, 1986 | [JP] | Japan | 61-106151 |
| May 9, 1986 | [JP] | Japan | 61-106152 |

[51] Int. Cl.$^5$ .............................................. G11B 23/00
[52] U.S. Cl. ..................................... 428/336; 428/694; 428/695; 428/900; 427/131; 427/132; 427/41
[58] Field of Search ............... 428/694, 900, 336, 695; 427/41, 128, 129, 131, 39, 132

[56] References Cited

U.S. PATENT DOCUMENTS

| 4,419,404 | 12/1983 | Arai | 428/900 |
| 4,429,024 | 1/1984 | Ueno | 427/41 |
| 4,565,734 | 1/1986 | Arai | 428/900 |
| 4,582,746 | 4/1986 | Shirahata | 428/900 |
| 4,693,927 | 9/1987 | Nishikawa | 428/900 |
| 4,696,845 | 9/1987 | Yanagisawa | 428/64 |
| 4,844,978 | 7/1989 | Nakayama | 428/336 |
| 4,880,687 | 11/1989 | Yokoyama | 428/141 |
| 4,889,767 | 12/1989 | Yokoyama | 428/336 |

FOREIGN PATENT DOCUMENTS

| 52-18001 | 5/1977 | Japan . |
| 54-33726 | 10/1979 | Japan . |
| 576177 | 2/1982 | Japan . |
| 57-17292 | 4/1982 | Japan . |
| 59-39809 | 9/1984 | Japan . |
| 160828 | 9/1984 | Japan . |
| 258727 | 12/1985 | Japan . |
| 142525 | 6/1986 | Japan . |

Primary Examiner—Merrell C. Cashion, Jr.
Assistant Examiner—Stevan A. Resan
Attorney, Agent, or Firm—Oblon, Spivak, McClelland, Maier & Neustadt

[57] ABSTRACT

In a magnetic recording medium wherein a metal thin film magnetic layer and an overcoat are formed on a nonmagnetic substrate, durability is improved when the overcoat comprises a plasma-polymerized film and a topcoat of an organic fluorine compound; a plasma-polymerized film, a protective carbon film, and a topcoat of an organic fluorine compound; a plasma-polymerized film containing C, F and H; or a plasma-polymerized organometallic film and a fluorine or silicon-containing topcoat. Oxidation of the upper surface of the magnetic layer with a plasma is also effective.

14 Claims, 2 Drawing Sheets

MAGNETIC RECORDING MEDIUM

This is a division of application Ser. No. 07/046,317, filed on May 6, 1987 now U.S. Pat. No. 4,880,687.

CROSS REFERENCE TO RELATED APPLICATIONS

Reference is made to copending applications Ser. No. 943,329 abandoned filed Dec. 19, 1986, Maruta et al, for Magnetic Recording Medium, Ser. No. 868,511 filed May 30, 1986, now U.S. Pat. No. 4,824,724 Ueda et al, for Magnetic Recording Medium, Ser. No. 033,617 filed Apr. 3, 1987 now U.S. Pat. No. 4,816,334 Yokoyama al, for Magnetic Recording Medium, and Ser. No. 07/041,489 filed Apr. 23, 1987, now U.S. Pat. No. 4,889,767 Yokoyama et al, for Magnetic Recording Medium, where all the applications are assigned to the same assignee as the present invention and incorporated herein by reference.

BACKGROUND OF THE INVENTION

This invention relates to a magnetic recording medium, and more particularly, to an improvement in the durability of a magnetic recording medium of the hard type such as magnetic disks and drums.

Magnetic recording media used in cooperation with magnetic disk apparatus are generally known as magnetic disks or disk media and have the basic structure comprising an annular substrate having a magnetic layer usually on each of its surfaces.

The materials of which the substrates of such magnetic recording media are made include two types, hard materials such as aluminum alloy and plastic materials such as Mylar as also used in magnetic tape media. In general, the former is called a magnetic disk of the hard type and the latter a flexible disk.

The magnetic recording media for use with magnetic disk or drum apparatus, particularly hard type magnetic disks encounter some problems of durability and abrasion resistance against mechanical contact with a magnetic head. To this end, magnetic recording media are usually provided with a protective coat. Known as the protective coat of such media are protective films of inorganic material and lubricating films of solid lubricant.

The inorganic protective films used in the prior art are formed from, for example, Rh and Cr as disclosed in Japanese Patent Publication No. 52-18001, Ni-P as disclosed in Japanese Patent Publication No. 54-33726, Re, Os, Ru, Ag, Au, Cu, Pt and Pd as disclosed in Japanese Patent Publication No. 57-6177, and Ni-Cr as disclosed in Japanese Patent Publication No. 57-17292. The commonly used solid lubricants are inorganic and organic lubricants including silicon compounds such as $SiO_2$, SiO, and $Si_3N_4$ as disclosed in Japanese Patent Publication No. 54-33726, polysilicic acid and silane coupling agents such as tetrahydroxysilane and polyaminosilane as disclosed in Japanese Patent Publication No. 59-39809, and carbon.

The conventional protective films formed on the magnetic layer from these materials are somewhat unsuccessful in enhancing the durability, abrasion resistance, weatherability, and corrosion resistance of the associated media and suffer from the phenomenon called grip that the head adheres to the medium surface.

In our copending application Ser. No. 943,329 filed Dec. 19, 1986, we proposed a combination of a topcoat layer and a protective carbon film on a magnetic recording medium, the topcoat layer comprised of an organic fluorine compound of the same type as used in the present invention and characterized by improvements in durability, abrasion resistance, weatherability, corrosion resistance and grip resistance. In our copending application Ser. No. 033,617 filed Apr. 3, 1987, directed to a similar magnetic recording medium, the topcoat layer is formed from an organic fluorine compound by gas phase deposition.

Also, in our copending application Ser. No. 868,511 filed May 30, 1986, we proposed a topcoat layer for a magnetic tape having a metal magnetic thin film layer, the topcoat layer being formed from a fluorocarbon resin by sputtering or ion plating.

In general, the disk medium has the structure wherein various necessary layers including primary, magnetic, and intermediate layers are disposed one on top of the other on a substrate. The durability of medium having such a layered structure depends on not only the nature of a protective layer disposed on the top surface of the medium, but also the adhesion or bond strength between the respective layers. A defective bond between any two layers will lead to a loss of the overall medium durability. There is the need for further improving the overall durability of magnetic recording medium.

SUMMARY OF THE INVENTION

An object of the present invention is to provide a novel and improved magnetic recording medium having excellent durability, abrasion resistance, weatherability, and corrosion resistance as well as increased reliability in practical applications.

The present invention is generally directed to a magnetic recording medium comprising a nonmagnetic substrate having opposed major surfaces, a metal thin film magnetic layer on one major surface of the substrate, and a topcoat layer on the magnetic layer.

According to a first aspect of the present invention, there is provided a magnetic recording medium comprising a nonmagnetic substrate having opposed major surfaces, a metal thin film magnetic layer on one major surface of the substrate, a plasma-polymerized film on the magnetic layer, and a topcoat layer comprising an organic fluorine compound on the plasma-polymerized film.

Preferably, a protective film of carbon is interposed between the plasma-polymerized film and the topcoat layer.

According to a second aspect of the present invention, there is provided a magnetic recording medium comprising a nonmagnetic substrate having opposed major surfaces, a metal thin film magnetic layer disposed on one major surface of the substrate, and a topcoat layer on the magnetic layer, said topcoat layer comprising a plasma-polymerized film containing carbon, fluorine, and optionally, hydrogen, the carbon content ranging from 30 to 80 atom %.

Preferably, the surface of the magnetic layer remote from the substrate is oxidized, typically with a plasma.

According to a third aspect of the present invention, there is provided a magnetic recording medium comprising a nonmagnetic substrate having opposed major surfaces, a metal thin film magnetic layer on one major surface of the substrate, a plasma-polymerized film of an organometallic compound on the magnetic layer, and a topcoat layer on the plasma-polymerized film.

BRIEF DESCRIPTION OF THE DRAWINGS

The above and other objects, features and advantages of the present invention will be more fully understood by reading the following detailed description taken in conjunction with the accompanying drawings, in which.

DETAILED DESCRIPTION OF THE PREFERRED EMBODIMENTS

First Embodiment

Figure 1:
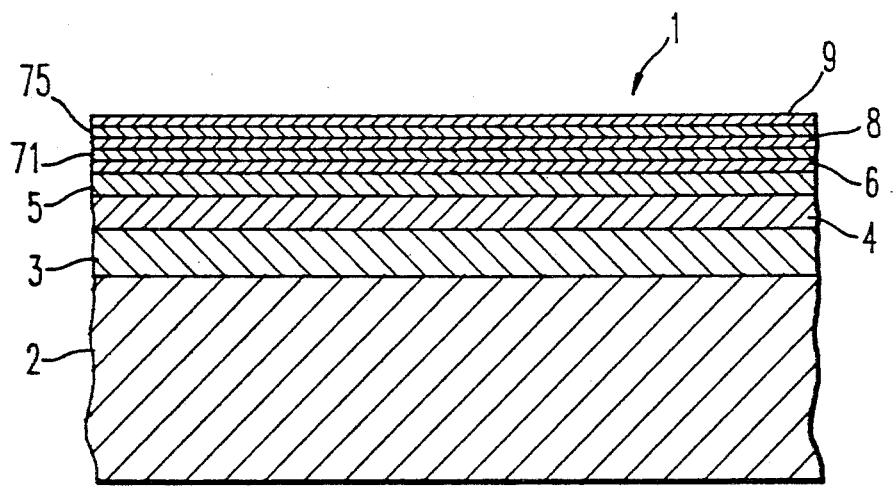
FIGS. 1 to 3 are schematic cross-sectional views of magnetic recording media according to some preferred embodiments of the present invention.

Referring to FIG. 1, there is illustrated in cross section a magnetic recording medium generally indicated at 1 according to a first preferred embodiment of the present invention. The magnetic recording medium 1 includes a nonmagnetic substrate 2 having opposed major surfaces for carrying a necessary number of layers thereon. In the broadest sense, on the substrate 2, an undercoat layer 3, an intermediate layer 4 of a nonmagnetic metal, a metal thin film magnetic layer 5, a protective layer 6 of a nonmagnetic metal, a protective carbon film 8, and a topcoat layer 9 are disposed one on top of the other in this order. Additionally in the illustrated embodiment, plasma-polymerized films 71 and 75 are disposed just below and above the protective carbon film 8, respectively. Although the two plasma-polymerized films are provided, at least one plasma-polymerized film suffices for the present invention. The plasma-polymerized film may be disposed contiguous to the protective nonmagnetic metal film 6 or the magnetic layer 5 if the film 6 is absent.

One layer has a pair of opposed surfaces, the upper surface remote from the substrate and the lower surface adjacent to the substrate. In most cases, the term surface used herein in conjunction with a layer or film represents the upper surface of the layer or film located remote from the substrate unless otherwise stated.

Plasma-polymerized film

The plasma-polymerized films 71 and 75 formed just below and above the protective carbon film 8 according to the present invention are each comprised of a thin plasma-polymerized film consisting essentially of carbon and hydrogen.

The film is prepared by activating a gaseous monomeric reactant into a plasma for plasma polymerization. Exemplary of the gaseous monomers there may be given saturated and unsaturated hydrocarbons, for example, methane, ethane, propane, butane, pentane, ethylene, propylene, butene, butadiene, acetylene, methylacetylene, and the like and mixtures thereof. Preferably, they are gaseous at room temperature because of ease of operation. If desired, a hydrocarbon which is liquid at room temperature may be used as the reactant for plasma polymerization. Useful reactant gas is a mixture of at least one of the hydrocarbons and at least one inorganic gas selected from $H_2$, $O_2$, $O_3$, $H_2O$, $N_2$, $NO_x$ including NO, $N_2O$ and $NO_2$, $NH_3$, CO, and $CO_2$. The reactant may optionally contain a minor proportion of silicon, boron, phosphorus, sulfur, etc.

The plasma-polymerized film is formed from such a reactant to a thickness of 3 to 300 Å. Thicknesses in excess of 300 Å undesirably increase the spacing loss (magnetic loss due to thickness component). Thicknesses of less than 3 Å are too thin to provide the observable effect. The film thickness may be measured by means of an ellipsometer. Control of film thickness in forming a plasma-polymerized film may be done by a choice of reaction time, reactant gas flow rate and other factors.

The plasma-polymerized film may be prepared on a subject by using the above-mentioned hydrocarbon as a gaseous monomeric reactant, creating a discharge plasma of the reactant, and contacting the plasma with the subject.

The principle of plasma polymerization will be briefly described. When an electric field is applied to a gas kept at a reduced pressure, free electrons which are present in a minor proportion in the gas and have a remarkably greater inter-molecular distance than under atmospheric pressure are accelerated under the electric field to gain a kinetic energy (electron temperature) of 5 to 10 eV. These accelerated electrons collide against atoms and molecules to fracture their atomic and molecular orbitals to thereby dissociate them into normally unstable chemical species such as electrons, ions, neutral radicals, etc. The dissociated electrons are again accelerated under the electric field to dissociate further atoms and molecules. This chain reaction causes the gas to be instantaneously converted into highly ionized state. This is generally called a plasma. Since gaseous molecules have a less chance of collision with electrons and absorb little energy, they are kept at a tempeature approximate to room temperature. Such a system in which the kinetic energy (electron temperature) of electrons and the thermal motion (gas temperature) of molecules are not correlated is designated a low temperature plasma. In this system, chemical species set up the state capable of additive chemical reaction such as polymerization while being kept relatively unchanged from the original. The present invention utilizes this state to form a plasma-polymerized film on a subject, for example, the protective carbon film carried on the substrate. The use of a low temperature plasma avoids any thermal influence on the subject including any previously deposited layers and the substrate.

Figure 4:
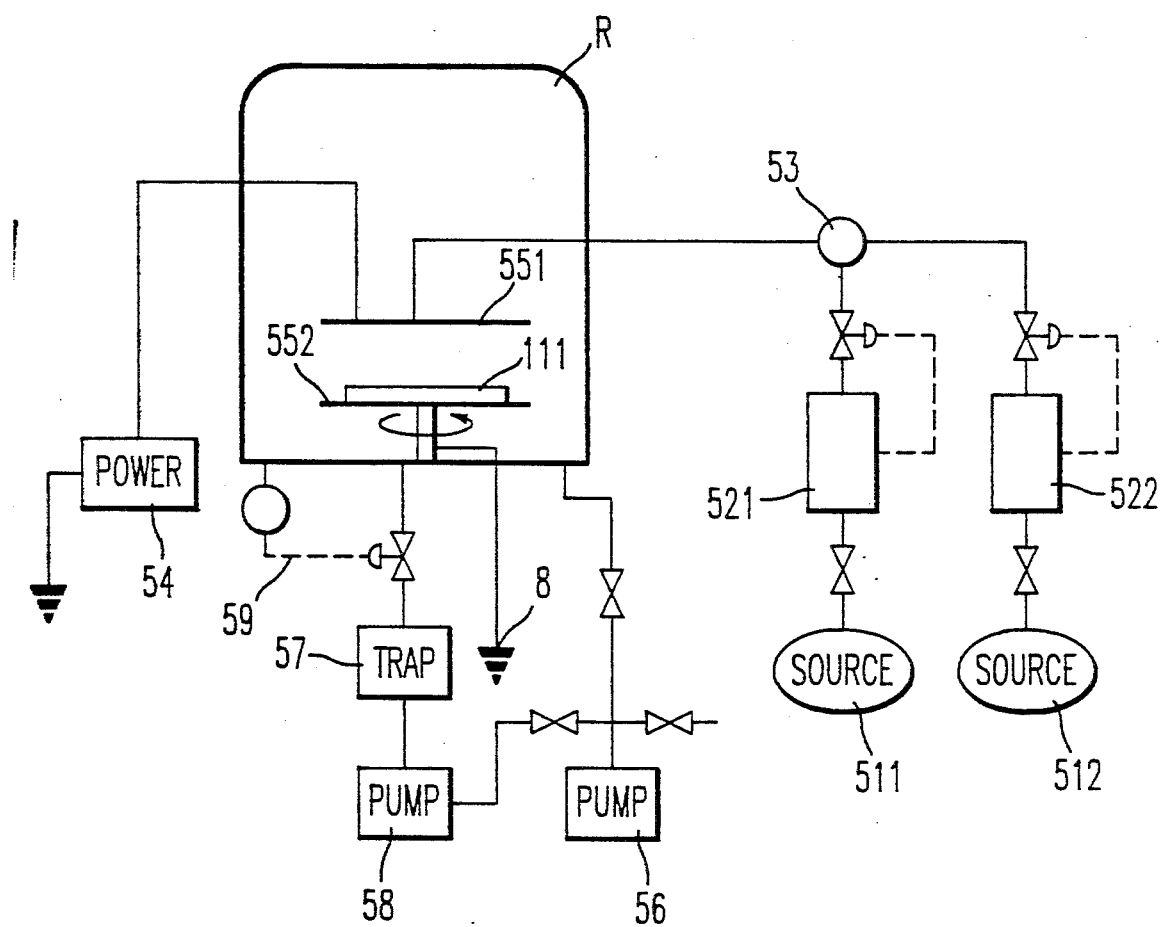
FIG. 4 is a schematic view of a plasma polymerizing apparatus.

FIG. 4 illustrates a typical apparatus in which a plasma-polymerized film is formed on the surface of a subject. This plasma-polymerizing apparatus uses a variable frequency power source. The apparatus comprises a reactor vessel R into which a gaseous reactant or reactants are introduced from a source 511 and/or 512 through a mass flow controller 521 and/or 522. When desired, different gases from the sources 511 and 512 may be mixed in a mixer 53 to introduce a gas mixture into the reactor vessel. The reactant gases may be fed each at a flow rate of 1 to 250 ml per minute.

Disposed in the reactor vessel R are a pair of opposed electrodes 551 and 552. One electrode 552 is a rotary support electrode on which a subject 111 to be treated rests. The subject 111 is placed between the electrodes 551 and 552. The electrode 551 is connected to a variable frequency power source 54 and the rotary support electrode 552 grounded at 8. Although the coated substrate to be treated is supported on the electrode in the reactor vessel in the illustrated embodiment, continuous operation can be made by continuously moving a length of substrate along the electrode, if desired.

The reactor vessel R is further connected to a vacuum system for evacuating the vessel, including an oil rotary vacuum pump 56, a liquefied nitrogen trap 57, an oil diffusion pump 58, and a vacuum controller 59. The vacuum system has the capacity of evacuating and keeping the reactor vessel R at a vacuum of 0.01 to 10 Torr.

In operation, the reactor vessel R is first evacuated by means of the vacuum pump to a vacuum of $10^{-3}$ Torr or lower before a reactant gas or gases are fed into the vessel at a predetermined flow rate. Then the interior of the reactor vessel is maintained at a vacuum of 0.01 to 10 Torr. When the flow rate of the reactant gas becomes constant, the variable frequency power 54 is turned on to generate a plasma with which the reactant is polymerized to form a plasma-polymerized film on the subject 111.

For plasma polymerization, a carrier gas such as argon, helium, nitrogen and hydrogen may be used.

The frequency of the power source is not critical to the plasma treatment according to the present invention. The source may be of DC, AC, and microwave in addition to the high-frequency electric discharge as mentioned above.

Preferably, the plasma-polymerized film is prepared by feeding a gaseous reactant into a plasma zone with W/F.M set to at least $10^7$ joule/kg where W is an input power applied for plasma generation as expressed in joule/sec., F is a flow rate of the reactant gas as expressed in kg/sec., and M is the molecular weight of the reactant. If W/F.M is less than $10^7$, the resulting plasma-polymerized film is insufficiently dense to exert the desired effect. The upper limit of parameter W/F.M is generally about $10^{15}$ joule/kg.

The remaining parameters such as applied current and operating time may be as usual and properly chosen without undue experimentation.

The plasma-polymerized film prepared as above preferably contains 30 to 100 atom %, more preferably 30 to 80 atom % of carbon. Preferably the plasma-polymerized film contains carbon and hydrogen in an atomic ratio of carbon to hydrogen (C/H) in the range of from 1:1 to 6:1. A plasma-polymerized film having such a C/H ratio exhibits outstandingly improved corrosion resistance and durability. C/H ratios of less than 1 provide films practically unacceptable in corrosion resistance, durability and strength. A substantial reduction in output occurs after repeated passes at C/H ratios of higher than 6.

The plasma-polymerized film may further contain up to 20 atom % of N, O, Si, B, P, or S, or a mixture thereof. Preferably, the plasma-polymerized film contains nitrogen and/or oxygen in a total amount of 2 to 40 atom %, especially 0 to 30 atom % because of improved low-temperature CSS characteristics.

It should be noted that the C/H and other atom ratios may be determined by SIMS (secondary ion mass spectroscopy), for example. When SIMS is used, the C/H ratio of the present plasma-polymerized film having a thickness of 3 to 300 Å may be calculated by determining the counts of C and H at the film surface. Alternatively, the C/H ratio may be calculated by determining the profile of C and H while effecting ion etching with Ar or the like. The measurement of SIMS may be in accord with the article "SIMS and LAMMA" in the Surface Science Basic Lectures, Vol. 3, 1984, Elementary and Application of Surface Analysis, page 70.

Plasma treatment

Preferably, in the preparation of the magnetic recording medium 1 shown in FIG. 1 according to the first embodiment of the present invention, any one or all of the surfaces of the magnetic layer 5, the protective nonmagnetic metal film 6, and the protective carbon film 8 may be pre-treated with a plasma before the plasma-polymerized films 71, 75 are formed. The plasma treatment of the surface of a layer increases the strength of bond between the layer and a subsequently applied layer, eventually contributing to improved durability of the medium.

The principle, procedure and conditions of plasma treatment are essentially the same as previously described for the plasma polymerization. It is to be understood that the plasma treatment uses, in principle, an inorganic gas as the treating gas whereas the plasma polymerization uses an organic reactant gas, optionally in admixture with an inorganic gas, to form a plasma-polymerized film.

The identity of gas is not critical to the plasma treatment. That is, the treating atmosphere used in the plasma treatment is not particularly limited. The atmosphere may be comprised of an inorganic gas selected from air, $H_2$, Ar, He, $O_2$, $O_3$, $H_2O$, $N_2$, $NH_3$, and $NO_x$ including NO, $N_2O$ and $NO_2$, and mixtures thereof.

The frequency of the power source is not critical to the plasma treatment according to the present invention. The source may be of DC, AC, and microwave. It is to be noted that other parameters including supply current and treating time may be as usual or properly selected without undue experimentation.

As previously described, the plasma-polymerized film is formed on the upper and/or lower surface of the protective carbon film 8. When the plasma-polymerized film 71 is present below the protective carbon film 8, the plasma-polymerized film is formed on the magnetic layer 5 directly or via the protective nonmagnetic metal film 6 as illustrated, and thereafter the protective carbon film is deposited. If desired or necessary, another plasma-polymerized film 75 may be formed on the protective carbon film. The provision of the plasma-polymerized films 71, 75 significantly improves the durability, abrasion resistance, weatherability, and corrosion resistance of the overall medium.

Topcoat layer

According to the first embodiment of the present invention, the topcoat layer 9 is disposed directly on the plasma-polymerized film 75 or on the protective carbon film 8 when the film 75 is absent. The topcoat layer is formed from an organic fluorine compound as the uppermost layer of the medium. The organic fluorine compound is preferably selected from the group consisting of (A) carboxyperfluoropolyethers and salts and esters thereof, (B) perfluoropolyethers, (C) tetrafluoroethylene polymers, and (D) other fluorocarbon resins.

(A) Carboxyperfluoropolyethers, salts and esters

In a first example, the topcoat layer contains a carboxyperfluoropolyether or a salt or ester thereof.

The perfluoropolyethers are perfluoro deviratives of polyalkylethers. The carboxyperfluoropolyethers are those perfluoropolyethers having a carboxylic acid radical or its salt substituted at their end. The number of carboxylic acid radicals is not particularly limited, but is preferably 1 or 2.

Typical carboxyperfluoropolyethers, salts, and esters used herein are compounds having the general formula (I):

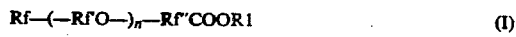  (I)

wherein Rf represents a fluorine atom, a perfluoroalkyl radical, —COOZ, or —ORf"COOZ;

Rf' and Rf" are independently selected from divalent perfluoroalkylene radicals and may be the same or different;

n is a positive integer, with the proviso that when n is 2 or more, a corresponding plurality of Rf' may be the same or different;

R1 represents hydrogen, a monovalent cation, or a substituted or unsubstituted alkyl radical; and Z has the same meaning as R1, with the proviso that Z and R1 in formula (I) may be the same or different.

Examples of the perfluoroalkyl radicals represented by Rf include —CF$_3$, 13 C$_2$F$_5$, —C$_3$F$_7$, etc. Examples of perfluoroalkylene radicals represented by Rf' and Rf" include —CF$_2$—, —CF$_2$CF$_2$—,

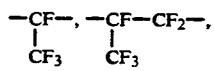

etc., with —CF$_2$—, —CF$_2$CF$_2$—, and —CF(CF$_3$)—CF$_2$— being preferred.

Preferred examples of Rf are —F, —COOCH$_3$, —COOH, —COOC$_2$H$_5$, and —COOC$_3$H$_7$.

Examples of the substituted or unsubstituted alkyl represented by R1 include —CH$_3$, —C$_2$H$_5$, —C$_3$H$_7$, i—C$_3$H$_7$, —C$_4$H$_9$, and —C$_5$H$_{11}$. R1 is preferably selected from unsubstituted alkyl radicals having 1 to 5 carbon atoms, more preferably —CH$_3$ and —C$_2$H$_5$.

Examples of the cations represented by R1 include alkali metal cations such as Na$^+$, K$^+$, and Li$^+$, and NH$_4^+$.

The letter n generally ranges from about 10 to about 100, preferably from 30 to 70.

When more than one Rf' is present, they may be the same or different.

The esters having formula (I) may be either carboxylic acid monoester or diesters.

Preferred among the compounds of formula (I) are those compounds having the general formulae:

ZOCOCF$_2$—[(O—CF$_2$—CF$_2$)$_m$—(O—CF$_2$)$_p$]—OCF$_2$— (I-1)

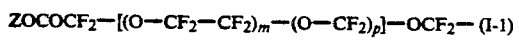

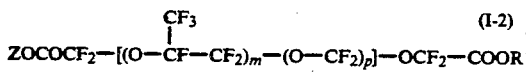

wherein Z and R1 are as defined in formula (I), the sum of m and p is the same as n defined in formula (I). Preferably Z and R1 are H and —CH$_3$, and each of m and p generally ranges from 5 to 50, preferably from 5 to 20.

Another preferred class includes those compounds having the general formulae:

  (I-3)

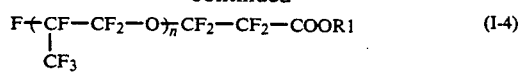  (I-4)

wherein R1 and n are as defined in formula (I). Preferably R1 is H, —CH$_3$ or —C$_2$H$_5$, and n generally ranges from 10 to 100, preferably from 30 to 70.

These compounds have a molecular weight of about 1,000 to 10,000.

These compounds may be readily synthesized by a conventional known method and are commercially available.

Typical examples of commercial products of these compounds are KRYTOX 157FS manufactured by E. I. DuPont which corresponds to the compounds of formula (I-3) wherein R1 is H and n is 11 to 49, FOMBLIN Z DIAC manufactured by Montefluos which corresponds to the compounds of formula (I-2), and FOMBLIN Z DEAL manufactured by Montefluos which corresponds to the compounds of formula (I-1) wherein Z and R1 are methyl, and m and p are 11 to 49.

(B) Perfluoropolyethers

In a second example, the topcoat layer contains a perfluoropolyether.

Typical perfluoropolyethers used herein are compounds having the general formula (II):

  (II)

wherein R2f represents a fluorine atom or a perfluoroalkyl radical; R2f' is a perfluoroalkylene radical; R2f" is a perfluoroalkyl radical; and n is a positive integer. When R2f is a perfluoroalkyl radical, R2f and R2f" may be the same or different. When n is 2 or more, a corresponding plurality of R2f' may be the same or different.

Examples of the perfluoroalkyl radicals represented by R2f include —CF$_3$, —C$_2$F$_5$, etc. Preferably, R2f is —F or —CF$_3$. Examples of perfluoroalkylene radicals represented by R2f' include —CF$_2$—, —CF$_2$CF$_2$—,

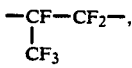

etc., Examples of the perfluoroalkyl radicals represented by R2f" include —CF$_3$, —C$_2$F$_5$, etc.

The letter n generally ranges from about 10 to about 100, preferably from 10 to 50.

Preferred among the compounds of formula (II) are those compounds having the general formulae (II-1) and (II-2):

  (II-1)

  (II-2)

wherein the sum of m and p is about 10 to 100. Each of m and p generally ranges from 5 to 50, preferably from 5 to 30.

Another preferred class includes those compounds having the general formula (II-3):

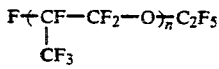
(II-3)

wherein n is as defined in formula (II). The letter n generally ranges from 10 to 100, preferably from 30 to 70.

These compounds have an average molecular weight of about 1,000 to 10,000.

These compounds may be readily synthesized by a conventional known method and are commercially available.

Typical examples of commercial products of these compounds are FOMBLIN Y04, Y06, Y25, Y45, YR; FOMBLIN Y-L-VAC0616, Y-L-VAC 14/6, Y-L-VAC 16/6, Y-L-VAC 25/6; FOMBLIN Y-H-VAC 18/8, Y-H-VAC 25/9, Y-H-VAC 40/11, Y-H-VAC 140/13; and FOMBLIN Z, all manufactured by Montefluos Company; and KRYTOX 143CZ, 143AZ, 143AA, 143AY, 143AB, 143AC, 143AD, KRYTOX 1502, 1504, 1506, 1509, 1514, 1516, 1525, 1618, 1625, 1645, 1680, and 1614, all manufactured by E. I. DuPont. Among them, KRYTOX 143CZ corresponds to the compounds of formula (II-3) wherein n is 11 to 49, and FOMBLIN Y and Z correspond to formulae (II-2) and (II-1), respectively.

(C) Tetrafluoroethylene polymers

In a third embodiment, the topcoat layer contains a tetrafluoroethylene polymer preferably having a molecular weight of 1,000 to 10,000.

The polymers preferably have a softening point of about 200° to 300° C. as measured according to ASTM E-28-58T and a melting point of about 200° to 350° C.

These polymers may be readily synthesized by a conventional well-known method and commercially available.

Typical examples of commercially available products of the tetrafluoroethylene polymers are Vydax A12, 5100, 550, and 525 manufactured by E. I. DuPont and AG-LUB manufactured by Asahi Glass K.K.

(D) Fluorocarbon resins

In a fourth example, the topcoat layer contains a fluorocarbon resin.

Typical fluorocarbon resins used herein include polyvinylidene fluoride (PVdF), polyvinyl fluoride (PVF), tetrafluoroethylene-hexafluoropropylene copolymers (FEP), tetrafluoroethylene-ethlylene copolymers (ETFE), tetra-fluoroethylene-perfluoroalkylvinyl ether copolymers (PFA), chlorotrifluoroethylene-ethylene copolymers (ECTFE), etc. Preferred among them are tetrafluoroethylene-hexafluoro-propylene copolymers (FEP) and tetrafluoroethylene-hexa-fluoropropylene copolymers (ETFE). The fluorocarbon resins preferably have an average degree of polymerization of about 700 to 3,000.

The compounds (A) to (D) may be present alone or as a mixture of two or more in the topcoat layer 9.

The total content of these fluorine comounds ranges from 50 to 100% by weight, preferably from 70 to 100% by weight based on the weight of the topcoat layer 9. Less than 50% by weight of the fluorine compound imparts insufficient lubricity to the topcoat.

Any other materials may be present in the topcoat layer 9. Preferred examples of the additional materials are fatty acids, fatty acid esters, epoxy resins, and phenolic resins.

The topcoat layer 9 may be formed by any desired methods including solvent deposition and gas phase deposition.

The solvent deposition includes spin coating, dipping and spray coating, for example. The coating solution used herein is usually prepared by adding 0.01 to 1.0% by weight, preferably 0.05 to 0.1% by weight of one or more of compounds (A) to (D), especially compounds (A) and (B) to fluorine solvent, typically Fron.

Coating conditions may be readily determined by those skilled in the art without undue experimentation. Spin coating favors 500 to 3,000 revolutions per minute and a spinning time of about 5 to 20 seconds. Dipping may be carried out by immersing a sample in a Fron or similar solvent for about 15 to 30 seconds for cleaning, then immersing in the coating solution for about 10 to 30 seconds, and pulling up at a speed of about 5 to 20 mm/second.

The gas phase deposition processes include evaporation, sputtering and ion plating. The solids component of compounds (A) to (D) may be used as a source for gas phase deposition. A mixture of two or more of compounds (A) to (D) may be present in the topcoat layer as previously described.

The gas phase deposition has the features that a thin deposit can be formed to a uniform thickness and no organic solvent is contained in the topcoat deposited. Therefore, the topcoat formed by gas phase deposition has various advantages including a uniform thickness, and less frequent grip by a head and low friction, all promising improved performance in actual operation.

The evaporation, sputtering and ion plating methods will be described in detail as typical gas phase deposition. Any of these methods may be utilized in the present invention although the use of vacuum deposition or sputtering is preferred.

First, the evaporation or vacuum deposition is a method wherein an evaporation source is melted and evaporated by heating in a highly evacuated atmosphere at about $10^{-3}$ Torr or lower by electron beam, resistance heating and the like. The resulting vapor is deposited, for example, on the substrate surface to form a thin film. The vapor particles are imparted with a kinetic energy of about 0.1 to 1 eV upon evaporation.

Next, the sputtering process will be described. The sputtering process may be further classified into plasma sputtering and ion beam sputtering depending on the region where operation is conducted.

In the plasma sputtering process, an abnormal glow discharge is generated in an atmosphere of an inert gas such as argon, a target of source material to be evaporated is sputtered with the resulting Ar ions, and the thus generated vapor of source material is deposited or condensed on the substrate. Included are a DC sputtering technique wherein a DC voltage of several kilovolts is applied and a high frequency sputtering technique wherein a high frequency power of several to several hundred kilowatts is applied. A magnetron type sputtering technique is also useful wherein a multi-pole sputtering equipment such as two, three or four pole sputtering equipment is used, and electromagnetic fields are applied in two perpendicular directions to impart a cycloidal motion to electrons in the plasma, as by a magnetron, to form a high density plasma, thereby reducing the voltage applied and improving the sputtering efficiency. If desired, instead of a pure inert gas atmosphere such as argon, there may be used reactive or chemical sputtering using an atmosphere containing an active gas such as $O_2$ and $N_2$ in admixture with argon.

In the ion beam sputtering process, a suitable ionization source like argon (Ar) is ionized. The ionized Ar is driven out as an ion beam in a high vacuum by applying a negative high voltage across driving electrodes. The ion beam is impinged on the surface of a target of source material to be evaporated. The resulting vapor of source material is deposited or condensed on the substrate.

In either sputtering process, the operating pressure is about $10^{-2}$ to $10^{-3}$ Torr.

These sputtering processes impart particles of source material with a kinetic energy of about several eV (electron volts) to about 100 eV which is substantially greater than the kinetic energy of about 0.1 eV to about 1 eV given by the evaporation processes.

Further, the ion plating process is an atomistic film forming process wherein evaporated material ions having a sufficient kinetic energy are bombarded on the surface of a substrate before and during formation of a film thereon. The basic functions involved are sputtering, heating and ion implantation of the substrate by bombarding ions, which affect the adherence, nucleation and growth of a film being deposited. The ion plating process may be further classified into plasma and ion beam processes depending on the region where operation is carried out.

In the plasma ion plating process, a substrate held at a negative potential is cleaned by impinging $Ar^+$ or similar cations thereon under a DC glow discharge, and an evaporation source is then heated to evaporate the source material which is ionized in the plasma. The resulting source material ions are accelerated under an electric field of increased intensity in a cathodic dark region of the glow discharge surrounding the substrate and then bombarded on the substrate with a high energy, whereby the material deposits on the substrate. Any techniques of plasma ion plating may be employed including DC application, high frequency excitation, and their combination, and their combination with various heating modes of the evaporation source. A plasma electron beam technique using a hollow cathode plasma electron gun may also be employed.

In the ion beam plating process, a source material is converted into ions by any ion producing means including sputtering, electron bombardment, or modified duoplasmatron equipment. The resulting vapor of source material ions is driven out into a high vacuum region under a controlled accelerating voltage to successively carry out cleaning and deposition on the surface of a substrate. A cluster ion beam technique for evaporation and crystal growth may also be employed wherein a jet of source material is injected from a crucible into a high vacuum through an injection nozzle to form a cluster containing $10^2$ to $10^3$ loosely combined atoms by utilizing an overcooling phenomenon due to adiabatic expansion.

The kinetic energy imparted to ions by ion plating is in the range of from about several ten eV to about 5000 eV, which is greatly higher than that given by dry coating processes, for example, evaporation process (about 0.1 eV to about 1 eV) and sputtering process (about several eV to about 100 eV). For this reason, the film deposited by ion plating exhibits an outstandingly increased adherence. An increased rate of deposition completes film formation within a short time.

A recently developed arc discharge ion plating technique involving thermionic ionization may also be used. The arc discharge ion plating technique includes heating an evaporation source to form a stream of vapor, impinging electrons emitted from a thermionic emission source against the vapor stream at a position near the evaporation source where the vapor stream is relatively dense, thereby ionizing the vapor stream, and focusing the ionized vapor stream under an electric or magnetic field at a substrate in a direction perpendicular thereto.

In these gas phase deposition processes, conditions such as substrate temperature, substrate-to-hearth or target distance and the like may be as usual.

The topcoat layer 9 may be formed by either coating or gas phase deposition as described above. Generally, the topcoat layer thus formed has a thickness of from 3 to 300 Å, preferably from 5 to 150 Å. A thickness of less than 3 Å fails to provide the benefits of the invention, particularly durability. Topcoat layers having a thickness in excess of 300 Å are liable to grip, giving rise to so-called head crush.

Protective carbon film

The topcoat layer 9 and the second plasma-polymerized film 75 may be formed on the protective carbon film 8. The protective carbon film 8 has a composition consisting essentially of carbon although the composition may contain less than 5% by weight of another element.

The protective carbon film 8 may be formed by any gas-phase deposition techniques including sputtering, ion plating, evaporation, and chemical vapor deposition (CVD). Among them sputtering is most preferred because there is produced a very coherent dense film which is effective in durability and weatherability improvements.

The protective carbon film 8 generally has a thickness of 10 to 800 Å, preferably 100 to 400 Å.

Preferably, the protective carbon film 8 is plasma treated at its surface prior to subsequent covering with the topcoat layer. The plasma treatment chemically activates the surface of the protective carbon film 8 so that the second plasma-polymerized film 75 or the topcoat layer 9 may be more firmly bonded thereto. The bond strength between the adjoining layers is then increased, offering significantly increased durability. The plasma treatment may be carried out as previously described.

Substrate

The nonmagnetic substrate 2 used in the practice of the present invention is usually rigid one and may be made of such materials as metals, for example, aluminum and aluminum alloys, glass, ceramics, and engineering plastics. Aluminum and aluminum alloys are preferred among them because of their mechanical rigidity, workability, and bond to the undercoat layer.

The nonmagnetic substrate 2 generally has a thickness of about 1.2 to about 1.9 mm and a shape of disk or drum although no particular limit is imposed on the thickness and shape.

Undercoat

Particularly when the nonmagnetic substrate 2 is a rigid metal substrate, typically aluminum or aluminum alloy, it is preferred to form the undercoat layer 3 on the substrate. The undercoat layer 3 may have a composition of Ni-P, Ni-Cu-P, Ni-W-P, Ni-B or the like. It may be formed by liquid phase plating, particularly electroless plating. The electroless plating produces a very dense film having increased mechanical rigidity, hardness, and processability.

More specifically, the compositions of the undercoat layer may be represented by the formulae:

$(Ni_xCu_y)_AP_B$ and $(Ni_xW_y)_AP_B$, wherein x:y=100:0 to 10:90, and
A:B=97:3 to 85:15 in weight ratio.
The Ni-B compositions are represented by the formula: $Ni_xB_y$ wherein x:y=97:3 to 90:10.

One exemplary process of the electroless plating involves alkaline degreasing, acidic degreasing, several cycles of zincate treatment, surface adjustment with sodium bicarbonate or similar agents, and subsequent plating in a nickel electroless plating bath at pH 4.0 to 6.0 at a temperature of about 80° to 95° C. for about ½ to about 3 hours. For further detail of the chemical plating, reference is made to Japanese Patent Publication Nos. 48-18842 and 50-1438.

The undercoat layer 3 has a thickness of about 3 to 50 μm, preferably about 5 to 20 μm.

In a further preferred embodiment, the undercoat layer 3 is provided with irregularities at the surface. To impart an irregular surface to the undercoat layer 3 on the disk-shaped substrate 2, abrasive is caused to act on the surface of the undercoat layer 3 while rotating the substrate, thereby forming irregular grooves on the undercoat surface in a concentric pattern. Alternatively, the irregularities may be randomly provided on the undercoat layer 3. The provision of irregularities results in improved properties of grip and durability.

When the undercoat layer 3 is absent, the substrate 2 may be directly provided with such irregularities on its surface.

Magnetic layer

On the substrate 2 optionally having the undercoat layer 3 is formed the metal thin film magnetic layer 5 comprising cobalt or a major proportion of cobalt and at least one of nickel, chromium, and phosphorus.

Illustrative examples of the composition of the metal thin film are Co-Ni, Co-Ni-Cr, Co-Cr, Co-Ni-P, Co-Zn-P, Co-Ni-Mn-Re-P, etc. Most preferred among them are Co-Ni, Co-Ni-Cr, Co-Cr, and Co-Ni-P. These alloys have the preferred compositions of
Co-Ni having a proportion of Co:Ni between 1:1 and 9:1 in weight ratio;
$(Co_xNi_y)_ACr_B$ wherein x:y=1:1 to 9:1 and A:B=99.9:0.1 to 75:25;
Co-Cr having a proportion of Co:Cr=7:3 to 9:1; and $(Co_xNi_y)_AP_B$ wherein x:y=1:0 to 1:9 and A:B=99.9:0.1 to 85:15. Recording properties decline outside these ranges.

These metal thin film magnetic layer 5 may be formed by any desired gas and liquid phase plating techniques. Sputtering, one of gas phase plating as described above, is preferred because there are produced magnetic layers having favorable magnetic properties.

The material of the target used herein is an alloy or metal mixture corresponding to the composition of the desired metal thin film magnetic layer 5.

When the metal thin film magnetic layer 5 has a composition of CoP or CoNiP, liquid phase plating methods, inter alia, electroless plating may be employed. Magnetic layers obtained by liquid phase plating also exhibit as good magnetic properties as those obtained by sputtering.

The bath composition and operating parameters used in the electroless plating are known and any suitable combination thereof may be used herein, as disclosed in Japanese Patent Publication Nos. 54-9136 and 55-14865.

The metal thin film magnetic layer 5 generally has a thickness of 200 to 5,000 Å, and preferably 500 to 1,000 Å.

Intermediate layer

When the metal thin film magnetic layer 5 is formed by sputtering as described above, it is preferred to interpose a nonmagnetic metal intermediate layer 4 containing Cr between the undercoat layer 3 and the magnetic layer 5. The provision of the nonmagnetic metal intermediate layer 4 contributes to improvements in magnetic properties and reliability of recording properties of the medium. Most preferably the nonmagnetic metal intermediate layer 4 consists of Cr although a Cr content of at least 99% by weight is acceptable.

The intermediate layer 4 may be formed by any of various known gas phase film forming methods. Usually, it is preferred to form the intermediate layer by sputtering as in the metal thin film magnetic layer 5 described above. The thickness of the nonmagnetic metal intermediate layer 4 generally ranges from about 500 to about 4,000 Å although it depends on the type of the metal thin film magnetic layer 5.

Protective nonmagnetic metal film

The magnetic recording medium 1 of the present invention preferably has a protective nonmagnetic metal film 6 of Cr or similar metal interposed between the metal thin film magnetic layer 5 and the protective carbon film 8 (or the first plasma-polymerized film 71 when it is present below the carbon film 8). The provision of the protective nonmagnetic metal film 6 significantly improves the durability and weatherability of the resulting magnetic recording medium. Most preferably, the protective nonmagnetic metal film 6 consists of Cr although a Cr content of at least 99% by weight is acceptable.

The protective nonmagnetic metal film 6 may be formed by any of known gas phase deposition processes, and usually it is preferable to form the protective film by sputtering. The protective nonmagnetic metal film 6 generally has a thickness of about 30 to 300 Å, preferably about 50 to 200 Å.

Second Embodiment

Figure 2:
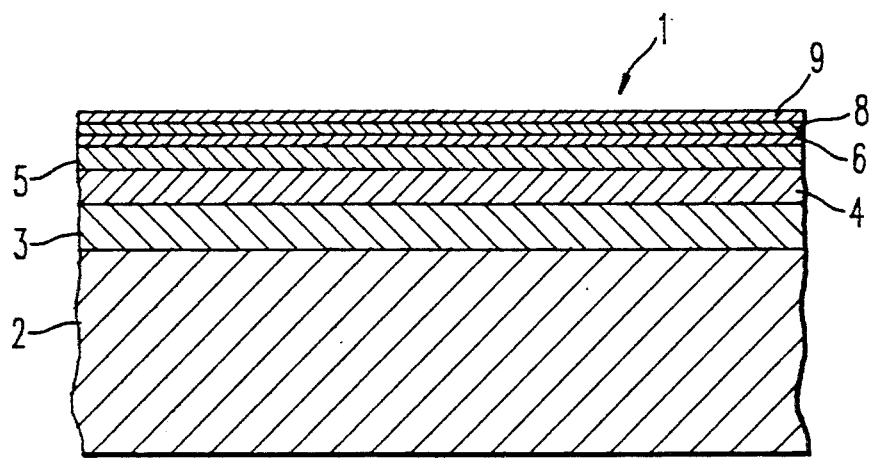

Referring to FIG. 2, there is illustrated in cross section a magnetic recording medium generally indicated at 1 according to one preferred embodiment of the second aspect of the present invention. The magnetic recording medium 1 includes a nonmagnetic substrate 2 having opposed major surfaces for carrying a necessary number of layers thereon. In general on the substrate 2, an undercoat layer 3, an intermediate layer 4 of a nonmagnetic metal, a metal thin film magnetic layer 5, a protective layer 6 of a nonmagnetic metal, a protective carbon film 8, and a topcoat layer 9 are disposed one on top of the other in this order.

Topcoat layer

The topcoat layer 9 in this embodiment is a thin plasma-polymerized film containing carbon and fluorine, or carbon, fluorine, and hydrogen.

The thin film containing these elements may be formed by activating a gaseous monomeric reactant into a plasma for plasma polymerization. Exemplary of the gaseous monomers there may be given fluorocarbons such as tetrafluoromethane, octafluoropropane, octafluorocyclobutane, tetrafluoroethylene, hexafluoropropylene, etc., and fluorinated hydrocarbons such as fluoromethane, difluoromethane, trifluoromethane, difluoroethane, tetrafluoroethane, etc., and mixtures thereof. Preferably, they are gaseous at room temperature because of ease of operation.

In admixture with the above-mentioned reactant, there may also be used saturated and unsaturated hydrocarbons, for example, methane, ethane, propane, butane, pentane, ethylene, propylene, butene, butadiene, acetylene, methylacetylene, etc. and mixtures thereof. Another fluoride such as boron fluoride, nitrogen fluoride, and silicon fluoride may also be used as one component of the reactant gas feed in admixture with the fluorine-containing reactant mentioned above. Also, fluorine-containing materials which are liquid or solid at room temperature, for example, Freon 12, Freon 13B1 and Freon 22, may also be used as a reactant if desired or necessary.

The reactant gas feed may optionally contain a minor proportion of nitrogen, oxygen, silicon, boron, phosphorus, etc. Then the topcoat film contains a minor proportion of such an element.

The carbon content of the topcoat film ranges from 30 to 80 atom %, more preferably from 30 to 60 atom %. Dynamic friction increases with carbon contents in excess of 80 atom % whereas carbon contents of less than 30 atom % detract from runnability.

In the preferred topcoat film, the atomic ratio of hydrogen to fluorine (H/F) ranges from 0.1 to 1.1, more preferably from 0.1 to 0.9:1. Dynamic friction increases with H/F ratios of more than 1.

The topcoat film preferably contains carbon and fluorine at an atomic ratio of fluorine to carbon (F/C) in the range from 0.3:1 to 2:1, more preferably from 0.5:1 to 1.5:1. A satisfactory loss of dynamic friction is not expected at a F/C ratio of less than 0.3:1. A F/C ratio of more than 2:1 results in a considerable output reduction with increasing passes.

Where the topcoat film contains carbon, fluorine, and hydrogen, the atomic ratio of carbon to hydrogen, (C/H) ranges from 2:1 to 8:1, preferably from 2.5:1 to 5:1. A C/H ratio of less than 2:1 is insufficient to ensure corrosion resistance whereas a C/H ratio in excess of 8:1 detracts from durability. The atomic ratio of hydrogen to fluorine (H/F) preferably ranges from 0.2:1 to 1:1, more preferably from 0.2:1 to 0.9:1. H/F ratios of less than 0.2:1 provide less satisfactory durability. Initial friction becomes too high with H/F ratios of more than 1:1.

In one preferred embodiment, the topcoat film is formed such that the atomic ratio of fluorine to carbon (F/C) increases toward the surface of the film. More illustratively, in the plasma-polymerized topcoat film, the average F/C atom ratio in the upper region of the film that extends from the surface remote from the substrate to ⅓rd of its thickness is at least 1.5 times, more preferably at least twice that in the lower region of the film that extends from the surface adjacent to the substrate to ⅓rd of its thickness. The topcoat film having such a gradient or distribution of fluorine concentration generally contains carbon, fluorine, and hydrogen, provided that the contents of carbon and the remaining elements in the entire film are within the above-defined range.

More preferably, the average F/C atom ratio in the upper ⅓ region of the film ranges from 1.5:1 to 3.0:1 whereas the average F/C atom ratio in the lower ⅓ region of the film ranges from 1.0:1 to 1.5:1 with the ratio of the former to the latter being at least 1.5:1. The presence of a fluorine rich surface region in the topcoat film increases the durability of the medium. The distribution of fluorine and carbon may be either continuous or discontinuous as long as the above-mentioned gradient is imparted. Such a graded distribution can be accomplished by controlling the composition of the plasma reactant gas feed with the lapse of time.

Elemental analysis of F/C in the topcoat film may be carried out by any conventional techniques such as SIMS, ESCA, and Auger spectroscopy The procedure of SIMS is as previously described.

The plasma-polymerized film topcoat has a thickness of 3 to 800 Å. A thickness in excess of 800 Å results in an undesirably increased spacing loss. Less than 3 Å fails to provide the benefits of the invention. It is to be noted that the thickness of the plasma-polymerized film preferably ranges from 3 to 300 Å where the protective carbon film is interposed between the magnetic layer and the topcoat layer as will be described later.

Preferably, the topcoat layer has a contact angle with water in the range from 100° to 130°, more preferably from 110° to 125°. Topcoat layers having a contact angle of less than 100° exhibit a higher initial friction and are unacceptable for actual utility. Plasma-polymerized films having a contact angle of more than 130° are difficult to form and unnecessary for most applications.

The film thickness may be measured by means of an ellipsometer and can be controlled by a choice of the reaction time, feed gas flow rate and other factors during film formation by plasma polymerization.

Preferably, the plasma-polymerized film is prepared by feeding a gaseous reactant into a plasma zone with W/(F.M) set to at least $10^7$ joule/kg where W is an input power applied for plasma generation as expressed in joule/sec., F is a flow rate of the reactant gas as expressed in kg/sec., and M is the molecular weight of the reactant. If W/F.M is less than $10^7$, the resulting plasma-polymerized film is insufficiently dense to provide the desired corrosion resistance. The upper limit of parameter W/F.M is generally about $10^{15}$ joule/kg. It is to be noted that when more than one reactant is used, F and M are the sum of them.

The reactant gases may be fed each at a flow rate of 1 to 250 ml per minute.

In operation, the reactor vessel R (see FIG. 4) is first evacuated by means of the vacuum pump to a vacuum of $10^{-3}$ Torr or lower before a reactant gas or gases are fed into the vessel at a predetermined flow rate. Then the interior of the reactor vessel is maintained at a vacuum of 0.01 to 10 Torr. When the flow rate of the reactant gas becomes constant, the variable frequency power is turned on to generate a plasma with which the reactant is polymerized to form a plasma-polymerized film on the subject.

For plasma polymerization, a carrier gas such as argon, helium, nitrogen and hydrogen may be used.

The frequency of the power source is not critical to the plasma treatment according to the present invention. The source may be of DC, AC, and microwave as well as high-frequency discharge. Current supply and treating time may be as usual.

The topcoat film 9 is most preferably formed on the protective carbon film 8, but may be on the surface of the protective nonmagnetic metal film 6 when the carbon film 8 is omitted as understood from FIG. 2.

As in the first embodiment, the surface of the protective carbon film may preferably be pretreated with a plasma. Plasma treatment chemical activates the surface of the protective carbon film so that the plasma-polymerized film or topcoat may be subsequently formed thereon in very firm adherence. For the same reason, it is effective to plasma-treat the surface of any layer on which the protective carbon film 7 is formed, for example, the protective nonmagnetic metal film 6.

Also preferably in the second embodiment, the protective nonmagnetic metal film 6 is interposed between the metal thin film magnetic layer 5 and the protective carbon film 8.

Magnetic layer

The magnetic layer 5 used herein comprises a major proportion of cobalt and oxygen, or cobalt, oxygen and at least one member selected from nickel, chromium and phosphorus. Preferably, oxygen is introduced in the magnetic layer mainly by plasma oxidizing the magnetic layer surface as will be described later.

In the magnetic layer, the average atomic ratio of oxygen to cobalt (O/Co) preferably ranges from 0.01:1 to 0.3:1, more preferably from 0.01:1 to 0.2:1. Atomic ratios O/Co of more than 0.3:1 lead to deterioration in rectangular ratio known as one of magnetic parameters. The effect of this embodiment is not exerted with atomic ratios of less than 0.01:1.

Most preferably, the average atomic ratio of oxygen to cobalt in the region of the magnetic layer that extends from its surface remote from the substrate to a level of 1/10th of its thickness is at least 3 times, especially at least 5 times the average atomic ratio of oxygen to cobalt in the region of the magnetic layer that extends from its surface adjacent to the substrate to a level of 1/10th of its thickness. Outside this range, durability, abrasion resistance, and weatherability are less improved.

The magnetic layer of the above-mentioned organization may be formed by first depositing a thin film comprised predominantly of Co or Co plus Ni, Cr and/or P on a substrate usually via an undercoat layer by any suitable methods such as sputtering and plating. The thin film is then oxidized to introduce oxygen into a surface region where oxygen forms oxides with ferromagnetic cobalt and optional metal. In a surface region, particularly a surface region extending from the surface remote from the substrate to a depth of 100 Å, more preferably to a depth of 50 Å, a peak indicative of oxide is observed by Auger spectroscopy.

The oxidizing treatment used herein is plasma oxidation. The use of plasma oxidation enables on-line treatment and uniform oxidation to achieve stable oxidation treatment, forming a dense oxidized film. There are additional benefits of elimination of chemical liquid and low temperature treatment. Plasma oxidation may be carried out by using an oxidizing gas as a treating gas, activating the gas into a electric discharge plasma, and contacting the plasma with the surface of a thin film of Co-Ni or similar ferromagnetic metal or alloy. As a result of plasma oxidation, the medium is remarkably improved in durability, abrasion resistance, weatherability, and corrosion resistance.

The principle of plasma oxidation is essentially the same as that previously described in conjunction with the plasma treatment and plasma polymerization. A low-temperature plasma is utilized in this case too. Plasma oxidation may be practiced using the apparatus as shown in FIG. 4.

In operation, the reactor vessel R is first evacuated by means of the vacuum pump to a vacuum of $10^{-3}$ Torr or lower before a treating gas or gases are fed into the vessel at a predetermined flow rate of 1 to 250 ml per minute. Then the interior of the reactor vessel is maintained at a vacuum of 0.01 to 10 Torr. When the flow rate of the treating gas becomes constant, the variable frequency power is turned on to generate a plasma with which the subject is oxidized.

The treating gas used in plasma oxidation may be at least one oxidizing gas selected from air, $O_2$, $O_3$, $H_2O$, CO, $CO_2$, and $NO_x$ including NO and $NO_2$, and mixtures thereof. An inorganic gas such as nitrogen, argon, helium and neon may additionally be used in combination with the oxidizing gas.

The frequency of the power source is not critical to the plasma treatment according to the present invention. The source may be of DC, AC, high frequency, and microwave. Other parameters including supply current and treating time may be as usual or properly selected without undue experimentation.

The metal thin film magnetic layer has a thickness of 200 to 5,000 Å, preferably 500 to 1,000 Å.

Before plasma oxidation, the metal thin film magnetic layer has a chemical composition predominantly comprising cobalt or cobalt plus at least one of nickel, chromium and phosphorus as previously described in the first embodiment.

On the magnetic layer 5 whose surface is plasma oxidized, a topcoat layer 9 as defined above may be formed with or without any desired intervening layers.

With respect to the nonmagnetic substrate 2, undercoat layer 3, and intermediate nonmagnetic metal layer 4, the same as previously described in conjunction with the first embodiment also applies to the second embodiment including material, preparation, surface processing and other parameters.

Further, a protective film 6 of a nonmagnetic metal such as chromium may be formed between the metal thin film magnetic layer 5 and the topcoat 9 as previously described in conjunction with the first embodiment. A protective carbon layer 8 may preferably formed on the protective nonmagnetic metal film 6. The protective carbon layer applied in the preferred embodiment has a thickness of 10 to 800 Å, more preferably 100 to 400 Å. Also the surfaces of the protective nonmagnetic metal film 6 and the protective carbon film 7 may be plasma treated as in the preceding embodiments. The plasma treatment enhances the bond between the treated layer and the overlying layer, resulting in media having improved durability. The plasma treatment may be carried out as previously described.

Third Embodiment

Figure 3:
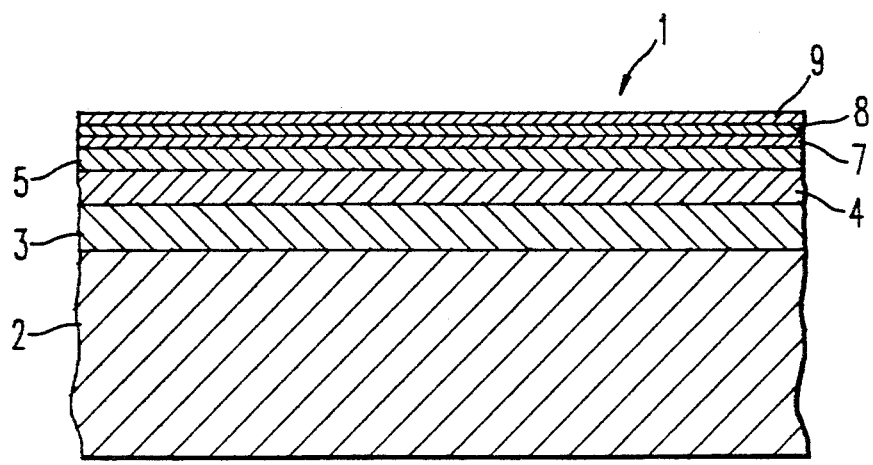

Referring to FIG. 3, the magnetic recording medium 1 according to the third embodiment of the present invention includes a nonmagnetic substrate 2 having opposed major surfaces for carrying a necessary number of layers thereon. In general on the substrate 2, an undercoat layer 3, an intermediate layer 4 of a nonmagnetic metal, a metal thin film magnetic layer 5, a protective layer 7 of a plasma-polymerized organometallic compound, a protective film 8 of carbon, and a topcoat layer 9 of a plasma-polymerized fluorine or silicon compound are disposed one on top of the other in this order.

Plasma-polymerized organometallic film

The protective layer 8 of plasma-polymerized organo-metallic compound may be formed by creating an electric discharge plasma of a carrier gas such as argon (Ar), helium (He), hydrogen ($H_2$) and nitrogen ($N_2$), introducing an organometallic compound in vapor form or vapor of a solution of an organometallic compound in an organic solvent into the discharge plasma, and contacting the activated gaseous mixture with the surface of a subject to be treated. The subject to be treated is a substrate having a magnetic layer already formed thereon in this embodiment. The organo-metallic compound used herein may be selected from organic compounds and organic complex salts of tin, titanium, aluminum, cobalt, iron, copper, nickel, manganese, zinc, lead, galium, indium, mercury, magnesium, selenium, arsenic, gold, silver, cadmium, germanium, etc. as long as they can be plasma polymerized.

Illustrative of the organometallic compounds are those having formulae (A), (B), (C), (D), (E), and (F). In the formulae, M is a metal, I to VI attached to M represent the valence of the metal, R is an organo radical, X is hydrogen or halogen.

$$M^I R \tag{A}$$

Examples are phenyl copper and phenyl silver.

$$M^{II} R_p X_{2-p} \tag{B}$$

In formula (B), p is equal to 1 or 2. Examples of the compounds of formula (B) include diethyl zinc, dimethyl zinc, methyl iodide mercury, methyl iodide magnesium, ethyl bromide magnesium, dimethyl mercury, dimethyl selenium, dimethyl magnesium, diethyl magnesium, diphenyl magnesium, dimethyl zinc, di-n-propyl zinc, di-n-butyl zinc, diphenyl zinc, diphenyl cadmium, diethyl mercury, di-n-propyl mercury, allyl ethyl mercury, and diphenyl mercury.

$$M^{III} R_q X_{3-q} \tag{C}$$

In formula (C), q is equal to 1, 2 or 3. Examples of the compounds of formula (C) include trimethylaluminum, triethylaluminum, triisobutylaluminum, trimethylgallium, trimethylindium, diethyl aluminum chloride, and trimethyl-gold.

$$M^{IV} R_R X_{4-r} \tag{D}$$

In formula (D), r is equal to 1, 2, 3 or 4. Examples of the compounds of formula (D) include tetramethyltin, di-n-butyl tin maleate, dibutyl tin diacetate, tetra-n-butyltin, tetraethyllead, tetramethyl germane, tetraethyl germane, diethylcyclogermanahexane, tetraphenyl germane, methyl germane, ethyl germane, n-propyl germane, triethyl germane, diphenyl germane, triphenyl germane, trimethyl bromogermane, triethyl bromogermane, triethyl fluorogermane, triethyl chlorogermane, dimethyl dichlorogermane, methyl trichlorogermane, diethyl dichlorogermane, diethyl dibromogermane, diphenyl dibromogermane, diphenyl dichlorogermane, ethyl trichlorogermane, ethyl tribromogermane, n-propyl trichlorogermane, tetraethyltin, trimethylethyltin, tetraallyltin, tetraphenyltin, phenyltrimethyltin, triphenylmethyltin, dimethyl dichloride tin, dimethyl tin dihydride, trimethyl tin hydride, triphenyl tin hydride, tetramethyllead, tetra-n-propyllead, tetraisopropyllead, trimethylethyllead, trimethyl-n-propyllead, and dimethyldiethyllead.

$$M^{VI} R_{6-s} \tag{E}$$

In formula (E), s is equal to 1, 2, 3, 4 or 6. Examples of the compounds of formula (E) include hexaethyl germane, hexamethyl ditin, hexaethyl ditin, and hexaphenyl ditin.

(F) Acetylacetone complex salts Examples are titanium acetylacetonate, aluminum acetyl-acetonate, cobalt acetylacetonate, iron acetylacetonate, copper acetylacetonate, nickel acetylacetonate, and manganese acetylacetonate.

In the formulae, R is an organic radical selected from alkyl having 1 to 10 carbon atoms, preferably alkyl having 1 to 6 carbon atoms, alkenyl having 2 to 6 carbon atoms, preferably allyl, aryl, preferably phenyl, and acyloxy, preferably maleoyl and acetyl; and X is hydrogen or halogen including fluorine, chlorine, bromine and iodine. Also included are phenylarsine oxide and analogs.

The plasma polymerization technique used herein is by creating an electric discharge plasma of a carrier gas such as argon (Ar), helium (He), hydrogen ($H_2$) and nitrogen ($N_2$), introducing an organometallic monomer into the discharge plasma, and contacting the activated gaseous mixture with the surface of a subject to be treated, thereby forming a plasma-polymerized film on the surface.

The principle of plasma polymerization is already described in the first embodiment. The reagents may be fed each at a flow rate of 1 to 250 ml per minute.

In operation, the reactor vessel R (see FIG. 4) is first evacuated by means of the vacuum pump to a vacuum of $10^{-3}$ Torr or lower before reactant gase is fed into the vessel at a predetermined flow rate. Then the interior of the reactor vessel is maintained at a vacuum of 0.01 to 10 Torr. When the flow rate of the reactant gas becomes constant, the variable frequency power is turned on to generate a plasma with which a polymerized film is formed on the subject.

In the plasma polymerization, a carrier gas may be used such as argon, helium, nitrogen and hydrogen.

The frequency of the power source is not critical to the plasma polymerization according to the present invention. The source may be of DC, AC, high frequency and microwave. It is to be noted that other parameters including supply current and reacting time may be as usual or properly selected without undue experimentation.

The plasma-polymerized film of organometallic compound is formed in this way to a thickness of 30 to 300 Å, preferably 50 to 300 Å. Plasma-polymerized films of less than 30 Å are too thin to accomplish the desired effect whereas films of more than 300 Å are practically undesired because of increased spacing losses.

The plasma-polymerized organometallic film preferably contains metal atoms M and carbon atoms C in an atomic ratio M/C of 0.05:1 to 1.0:1, more preferably 0.08:1 to 0.8:1. Atomic ratios M/C of less than 0.05 little contribute to adhesion improvement whereas films having atomic ratios of more than 1.0:1 are too hard.

The plasma-polymerized film is a three dimensionally grown thin film of uniform thickness which firmly adheres to the underlying subject (e.g. substrate). Thus the medium having the plasma-polymerized film interposed therein exhibits very high durability.

The plasma-polymerized organometallic film 7 is generally formed directly on the metal thin film magnetic layer 5 as illustrated in FIG. 3. On the protective film 7 of plasma-polymerized organometallic compound is formed a topcoat 9 of plasma-polymerized fluorine or silicon compound with or without interposing a protective film 8 of carbon. The plasma-polymerized organometallic film 7 plays a role of an intermediate layer for joining together the metal thin film magnetic layer 5 and the topcoat 9 or the protective carbon film 8 when applied. Because of the combined physical properties of metal and organic matter, the plasma-polymerized organometallic film imparts outstandingly improved strength to the bonding interface in the resulting laminate structure. The durability of the resulting medium is markedly improved.

Topcoat

On the plasma-polymerized organometallic film 7 is formed the topcoat layer 9, particularly plasma-polymerized film containing fluorine or silicon as described above.

The plasma-polymerized topcoat film may be prepared by substantially the same plasma polymerizing method as previously described. The presence of fluorine or silicon in the film is effective in improving durability, particularly durability as evaluated by a CSS test.

Wih respect to the plasma-polymerized topcoat film containing fluorine, the material, preparation, fluorine and carbon composition and distribution, and other parameters involved are the same as previously described in conjunction with the second embodiment.

Now, the plasma-polymerized topcoat film containing silicon will be described. Silicon may be contained in the plasma-polymerized film by polymerizing a silicon containing compound with the aid of a plasma according to essentially the same plasma polymerizing procedure as previously described.

The reactant gases used herein include, for example, silicon hydride, tetramethylsilane, hexamethyldisilane, 1,1,3,3,5,5-hexamethylcyclotrisilazane, tetravinylsilane, 3,3,3-trifluoropropyltrichlorosilazane, methyl-3,3,3-trifluoropropyldichlorosilane, 3,3,3-trifluoropropyltrimethoxysilane, tetramethoxysilane, tetraethoxysilane, octamethylcyclotetrasiloxane, hexamethylcyclosiloxane, hexamethoxydisiloxane, hexaethoxydisiloxane, triethoxyvinylsilane, dimethylethoxyvinylsilane, trimethoxyvinylsilane, methyltrimethoxysilane, dimethoxymethylchlorosilane, dimethoxymethylsilane, trimethoxysilane, dimethylethoxysilane, trimethoxysilanol, hydroxymethyltrimethylsilane, methoxytrimethylsilane, dimethoxydimethylsilane, ethoxytrimethoxysilane, bis(2-chloroethoxy)methylsilane, acetoxytrimethylsilane, chloromethyldimethylethoxysilane, 2-chloroethoxytrimethylsilane, ethoxytrimethylsilane, diethoxymethylsilane, ethyltrimethoxysilane, tris(2-chloroethoxy)silane, dimethoxymethyl-3,3,3-trifluoropropylsilane, 1-chloromethyl-2-chloroethoxytrimethylsilane, allyloxytrimethylsilane, ethoxydimethylvinylsilane, isopropylphenoxytrimethylsilane, 3-chloropropyldimethoxymethylsilane, chloromethyldiethoxymethylsilane, triethoxychlorosilane, 3-chloropropyltrimethoxysilane, diethoxydimethylsilane, dimethoxy-3-mercaptopropylmethylsilane, triethoxysilane, 3-mercaptopropyltrimethoxysilane, 3-aminopropyltrimethoxysilane, diethoxymethylvinylsilane, chloromethyltriethoxysilane, tert.-butoxytrimethylsilane, butyltrimethoxysilane, methyltriethoxysilane, 3-(N-methylaminopropyl)triethoxysilane, diethoxydivinylsilane, diethoxydiethylsilane, ethyltriethoxysilane, 2-mercaptoethyltriethoxysilane, 3-aminopropyldiethoxydimethylsilane, p-chlorophenyltriethoxysilane, phenyltrimethoxysilane, 2-cyanoethyltriethoxysilane, allyltriethoxysilane, 3-chloropropyltriethoxysilane, 3-allylaminopropyltrimethoxysilane, propyltriethoxysilane, hexatrimethoxysilane, 3-aminopropyltriethoxysilane, 3-methylacryloxypropyltrimethoxysilane, methyltris(2-methoxyethoxy)silane, diethoxymethylphenylsilane, p-chlorophenyltriethoxysilane, phenyltriethoxysilane, tetraallyloxysilane, tetrapropoxysilane, tetraisopropoxysilane, dimethoxydiphenylsilane, diethoxydiphenylsilane, tetraphenoxysilane, 1,1,3,3-tetramethyldisiloxane, hexamethyldisiloxane, octamethyltrisiloxane, 1,1,1,3,5,5,5-heptamethyltrisiloxane, hexaethylcyclotrisiloxane, and 1,3,5-trimethyl-1,3,5-triphenylcyclotrisiloxane. Also useful are fluorinated silicon compounds such as tetrafluorosilane, hexafluorodisilane, and octafluorotrisilane. A mixture of them may also be used.

A mixture of any one or more members of the above-mentioned silicon compounds and one or more members of fluorinated carbon compounds, fluorinated hydrocarbons, and hydrocarbons may be used.

The silicon-containing topcoat film contains 5 to 50 atom % of carbon. The content of silicon is such that the atom ratio of silicon to carbon (Si/C) ranges from 0.5:1 to 20:1, more preferably from 1:1 to 18:1. Friction reduction is insufficient with Si/C ratios of less than 0.5:1. Polymerized films having Si/C ratios of more than 20:1 are rather weak. Elemental analysis may be carried out by the same procedure as previously described.

The plasma-polymerized film topcoat has a thickness of 3 to 300 Å irrespective of whether it contains fluorine or silicon. A thickness in excess of 300 Å results in an undesirably increased spacing loss. Less than 3 Å fails to provide the benefits of the invention.

Preferably, the topcoat layer has a contact angle with water in the range from 60° to 130°, more preferably from 65° to 125°. Topcoat layers having a contact angle of less than 60° exhibit a higher initial friction and are unacceptable for actual utility. Plasma-polymerized films having a contact angle of more than 130° are difficult to form and unnecessary for most applications. In the case of the fluorine-containing topcoat, preferably the contact angle ranges from 100° to 130°, more preferably from 110° to 125°.

The film thickness may be measured by means of an ellipsometer and can be controlled by a choice of the reaction time, feed gas flow rate and other factors during film formation by plasma polymerization.

As preferred in the fluorine-containing plasma-polymerized film topcoat, it is also preferred to form the silicon-containing topcoat film such that silicon is rich in a surface region of the film. That is, the atomic ratio of silicon to carbon (Si/C) increases toward the surface of the film. More illustratively, in the plasma-polymerized topcoat film, the average Si/C atom ratio in the upper region of the film that extends from the surface remote from the substrate to ⅓rd of its thickness is at least 1.5 times, more preferably at least twice that in the lower region of the film that extends from the surface adjacent to the substrate to ⅓rd of its thickness. Such a graded silicon distribution results in improved durability.

It is, of course, possible to incorporate both fluorine and silicon in the topcoat layer according to the present invention.

Preferably, the plasma-polymerized film is prepared by feeding a gaseous reactant into a plasma zone with W/F.M set to at least $10^7$ joule/kg where W is an input power applied for plasma generation as expressed in joule/sec., F is a flow rate of the reactant gas as expressed in kg/sec., and M is the molecular weight of the reactant. If W/F.M is less than $10^7$, the resulting plasma-polymerized film is insufficiently dense to provide the desired corrosion resistance. The upper limit of parameter W/F.M is generally about $10^{15}$ joule/kg.

With respect to the nonmagnetic substrate 2, undercoat layer 3, and intermediate nonmagnetic metal layer 4, the same as previously described in conjunction with the first embodiment also applies to the third embodiment including material, preparation, surface processing and other parameters.

Further, an additional protective film of nonmagnetic metal may be formed between the metal thin film magnetic layer 5 and the protective film 7 of plasma-polymerized organometallic compound although this arrangement is not shown in FIG. 3.

The protective carbon layer 8 may preferably formed directly on the protective film 7 of plasma-polymerized organometallic compound. The provision of the protective carbon layer further improves durability and weatherability. The protective carbon layer generally consists of carbon alone, but may contain up to 5% by weight of another element. It is preferably formed by sputtering as previously described.

Preferably a plasma treatment is carried out before the protective film 7 of plasma-polymerized organometallic compound is formed. More particularly, the surface of the magnetic layer 5 is plasma treated. In addition, the protective carbon film 8 is preferably plasma treated at its surface prior to its covering with the topcoat layer. The plasma treatment chemically activates the surface of the layer so that the overlying layer may be more firmly bonded to the underlying layer. The bond strength between the adjoining layers is then increased, offering significantly increased durability. The plasma treatment may be carried out as previously described.

Although the essential layers for each embodiment are described in detail, such essential elements and optional elements are also applicable to different embodiments. For example, provision of a protective plasma-polymerized film and a protective carbon layer are also applicable to the second and third embodiments. Any desired combination of undercoat, intermediate and protective layers may be additionally provided in the respective embodiments.

Although the magnetic recording medium is described as a single-side recording medium as shown in FIGS. 1-3, it may be a double-side recording medium wherein a series of layers including a magnetic layer are formed on each surface of a substrate in a similar manner as in FIGS. 1-3.

The magnetic recording media according to the present invention exhibit improved durability, abrasion resistance, weatherability, and corrosion resistance as well as minimized head grip, offering high reliability in actual service.

EXAMPLES

In order that those skilled in the art will better understand the practice of the present invention, examples of the present invention will be described below.

EXAMPLE 1

On a disk-shaped aluminum substrate having a diameter of 13 cm and a thickness of 1.9 mm was formed an undercoat layer of NiP to a thickness of 20 μm by electroless plating. The electroless plating was carried out by successively conducting the following steps under the described conditions.

NiP electroless plating

Steps & Their Conditions
1) Alkaline degreasing: Alprep 204 (Okuno Seiyaku K.K.) 250 ml/l, 65° C., 5 min.
2) Acidic degreasing: Alprep 230 (Okuno Seiyaku K.K.) 150 ml/l, 65° C., 5 min.
3) Zincate: Arp 302 (Okuno Seiyaku K.K.) 250 ml/l, 25° C., 30 sec.
4) Zincate removal: 62 vol % conc. nitric acid 600 ml/l, 25° C., 30 sec.
5) Zincate: Arp 302 (Okuno Seiyaku K.K.) 250 ml/l, 25° C., 20 sec.
6) Surface adjustment: sodium bicarbonate 30 g/l, 20° C., 30 sec.
7) Nickel plating: Niclad 719A (Okuno Seiyaku K.K.) 80 ml/l + Niclad 719B (Okuno Seiyaku K.K.) 150 ml/l, pH 4.5, 90° C., 2 hours.

The thus deposited undercoat layer had a composition of Ni:P equal to 85:15 in weight ratio and a thickness of 20 μm.

In addition to the aluminum substrate having an undercoat of NiP carried thereon, substrates of various materials including aluminum, glass (available from Corning Glass), and plastics (polyetherimide resin) were also employed as reported in Table 1.

Then, the surface of various substrates (or the surface of the undercoat layer if the substrate has an undercoat on its surface) was abraded under the following conditions.

Surface Abrasion

The lapping machine used was Model 9B-5P manufactured by Speedfam K.K. While the substrate is being rotated, its surface was abraded using an abrasion liquid, Medipole No. 8 (50% diluted) manufactured by Fujimi Kenma K.K. under a load of 100 grams for 10 minutes.

The abraded substrate was cleaned in a disk cleaning apparatus available from Speedfam Clean System K.K. This cleaing includes the following steps.

Cleaning
1) Neutral detergent solution, dipping and ultrasonic cleaning,
2) Superpure water, scrubbing,
3) Superpure water, scrubbing,
4) Superpure water, dipping and ultrasonic cleaning,
5) Superpure water, dipping,
6) Fron/ethanol mixture, dipping and ultrasonic cleaning,
7) Fron/ethanol mixture, dipping,
8) Fron/ethanol mixture, evaporation,
9) Drying After the cleaning procedure, the surface of the substrate (or the surface of the undercoat layer if the substrate has an undercoat on its surface) was provided with irregularities by a texturizing procedure as described below. Using a tape polishing machine manufactured by Tomoe Techno K.K., irregular grooves were formed on the substrate surface in a concentric pattern while the substrate is being rotated. The polishing parameters are: polishing tape #4000, contact pressure 1.2 kg/cm$^2$, oscillation 50 cycles/min., and 150 work revolutions per minute.

After the substrate was cleaned again by substantially the same procedures as described above, the substrate was subjected to an etching treatment under an argon gas pressure of 0.2 Pa and an RF power of 400 W, and chromium was sputtered to form a nonmagnetic metal intermediate layer on the substrate to a thickness of 2,000 Å. The sputtering parameters are: argon pressure 2.0 Pa and DC 8 kilowatts.

Thereafter, one of the following variety of metal thin film magnetic layers was formed contiguous to the intermediate layer. It should be noted that in case the magnetic layer be formed by electroless plating, the etching treatment mentioned above and the nonmagnetic metal intermediate layer of Cr were omitted.

Preparation of metal thin film magnetic layer

Magnetic layer No. 1 (ML1)

A CoNi magnetic layer was formed by sputtering under an argon pressure of 2.0 Pa and DC 8 kilowatts. The CoNi composition was Co/Ni=80/20 in weight ratio. The film thickness was 600 Å.

Magnetic layer No. 2 (ML2)

A CoNiCr magnetic layer was formed by sputtering under an argon pressure of 2.0 Pa and DC 8 kilowatts. The CoNiCr composition was Co/Ni/Cr=62.5/30/7.5 in weight ratio. The film thickness was 600 Å.

Magnetic layer No. 3 (ML3)

A CoCr magnetic layer was formed by sputtering under an argon pressure of 2.0 Pa and DC 8 kilowatts. The CoCr composition was Co/Cr=87/13 in weight ratio. The film thickness was 1000 Å.

Magnetic layer No. 4 (ML4)

A CoNiP magnetic layer was formed by electroless plating under conditions described below. The CoNiP composition was Co/Ni/P=6/4/1 in weight ratio. The film thickness was 1000 Å.

The steps and conditions of the electroless plating process are given below.
1) Alkaline degreasing: Alprep 204 (Okuno Seiyaku K.K.) 250 ml/l, 65° C., 5 min.
2) Acidic degreasing: Alprep 230 (Okuno Seiyaku K.K.) 150 ml/1, 65° C., 5 min.
3) Hydrochloric acid degreasing: 5 vol % HCl, 25° C., 1 min.
4) Sulfuric acid degreasing: 5 vol % H$_2$SO$_4$, 25° C., 1 min.
5) Nickel plating: Niclad 719A (Okuno Seiyaku K.K.) 80 ml/l Niclad 719B (Okuno Seiyaku K.K.) 150 ml/l, pH 4.5, 90° C., 30 sec.

| 6) Cobalt plating: plating bath | mol/liter |
|---|---|
| Cobalt sulfate | 0.06 |
| Nickel sulfate | 0.04 |
| Sodium hypophosphite | 0.25 |
| Rochelle salt | 1.00 |
| Ammonium sulfate | 0.40 |

| 6) Cobalt plating: plating bath | mol/liter |
|---|---|
| Boric acid | 0.10 | plus NaOH, pH 9.5, 70° C., 3 min.

On each of the various metal thin film magnetic layers thus deposited was formed a protective nonmagnetic metal film of Cr. Film deposition was by sputtering chromium under an argon gas pressure of 2.0 Pa and DC 8 kilowatts. The film was 200 Å thick.

It is to be noted that only when the metal thin film magnetic layer is of magnetic layer No. 4 as identified above, the surface of the metal thin film magnetic layer was etched under an argon gas pressure of 0.2 Pa and an RF power of 400 watts immediately before the protective nonmagnetic metal film was deposited.

The surface of the protective nonmagnetic metal film was subjected to a plasma treatment under the following conditions.

Plasma Treatment
Treating gas: Ar
Gas flow rate: 50 ml/min.
Vacuum: 0.1 Torr
Power frequency: 13.56 MHz
Treating time: 30 seconds On the plasma-treated surface of the protective monmagnetic metal film, each of various plasma-polymerized films as reported in Table 1 was formed.

More particularly, the coated substrate was placed in a vacuum chamber, which was evacuated to a vacuum of 10$^{-3}$ Torr and then charged with predetermined flow rates of a selected gaseous hydrocarbon monomer and an argon carrier gas so as to maintain a gas pressure of 0.1 Torr. A high frequency voltage was applied at 13.56 MHz and 10 to 5,000 watts to generate a plasma flame, with which the hydrocarbon monomer was polymerized to form a plasma-polymerized film. The thickness of the thus formed film is reported in Table 1.

It is to be noted that elemental analysis of these plasma-polymerized films was made by SIMS and film thickness was measured by means of an ellipsometer.

The surface of the plasma-polymerized film was cleaned with unwoven fabric. On top of the plasma-polymerized film was formed a topcoat layer by depositing a topcoat composition containing selected one of various organic fluorine compounds as mentioned below using spin coating and vacuum deposition. All the topcoat layers were formed to a thickness of 30 Å.

Topcoat layer composition

Topcoat Composition 1 (TC1)

The topcoat layer was formed by spin coating. The organic fluorine compound used was KRYTOX 157FS commercially available from E. I. DuPont and having the structural formula:

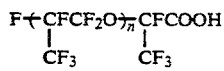

wherein n is 11 to 49. The fluorine compound was mixed with a solvent, Fron 113 (Daifron S-3 available from Daikin Kogyo K.K.) to form a coating solution containing 0.05% by weight of the fluorine compound. The solution was spin coated at 1,000 revolutions per minute for 10 seconds.

Topcoat composition 2 (TC2)

The topcoat layer was deposited by vacuum deposition. The evaporation source used was the solids of FOMBLIN Y 25 having a molecular weight of 3,000 and commercially available from Montefluos Company. The evaporation conditions included an argon atmosphere at a pressure of $1 \times 10^{-2}$ Pa and a sample-to-source distance of 5 cm.

Topcoat composition Si-Oil

The material used was a silicone oil (Toshiba Silicone TSF451) having a viscosity of 1,000 centipoise. The material was mixed with a Fron 113 solvent to form a coating solution containing 0.05% by weight of the material. The solution was spin coated under the same conditions as TC1.

Coating composition Si-Oil, which is outside the scope of the present invention, was employed for comparative purposes.

In this way, a number of magnetic disk samples were fabricated as reported in Table 1 and measured for various properties.

It should be noted that in sample No. 13, the plasma-polymerized film according to the present invention was replaced by a sputtered carbon film. The sputtered film was 300 Å thick.

(1) Weatherability

A 5¼-inch magnetic disk was loaded in a disk drive and placed in a clean, constant-temperature, constant-humidity chamber where the disk was allowed to stand for one month at 70° C. and RH 90%. The number of errors per disk recording side of the disk sample was counted using a disk certifier manufactured by Hitachi Electronic Engineering K.K. with the slicing level of missing pulses set at 65%. An increase of the number of errors or missing pulses before and after the weathering test was reported in bits per side.

(2) Coefficient of friction ($\mu$)

After a 30,000-cycle contact start-and-stop (CSS) test, the disk in contact with the head was allowed to stand at 20° C. and RH 60% for three days. The surface of the disk sample was measured for coefficient of friction. The head used was an Mn-Zn ferrite head.

The results are shown in Table 1.

layer except that the protective chromium film was 50 Å thick and the plasma treatment on the protective chromium film used hydrogen instead of argon. In this example, the plasma-polymerized film formed on the magnetic layer in the same manner as in Example 1 is referred to as a first plasma-polymerized film.

On the first plasma-polymerized film, a protective carbon film was formed by sputtering carbon under an argon gas pressure of 0.2 Pa and DC 8 kilowatts. The protective film was 250 Å thick.

The surface of the protective carbon film was plasma treated under the same conditions as used in the plasma treatment of the surface of the protective nonmagnetic metal film.

A second plasma-polymerized film was formed on the protective carbon film as desired. More particularly, in sample Nos. 201 to 210, 213, and 214, the second plasma-polymerized film was formed on the protective carbon film under the same conditions as used in the formation of the corresponding first plasma-polymerized film. That is, in these samples, the first and second plasma-polymerized films were identical. In sample Nos. 217 and 218, second plasma-polymerized films which were the same as the first plasma-polymerized films of sample Nos. 201 and 202 were formed on the protective carbon film, respectively.

The surface of the plasma-polymerized film was cleaned with unwoven fabric. On top of the plasma-polymerized film was formed a topcoat layer by depositing a topcoat composition containing selected one of various organic fluorine compounds as mentioned below using spin coating and sputtering. All the topcoat layers were formed to a thickness of 40 Å.

Topcoat layer composition

Topcoat Composition 1 (TC1)

Same as in Example 1.

Topcoat composition 22 (TC22)

The topcoat layer was deposited by sputtering. The source material used as the target in sputtering was KRYTOX 157FS. The resin composition was applied onto a plate followed by evaporation of the solvent therefrom, obtaining a plate-like target, of the solid resin.

TABLE 1

| Sample No. | Substrate | Magnetic Layer | Plasma-Polymerized Film ||||| Topcoat | Weather-ability | $\mu$ |
|---|---|---|---|---|---|---|---|---|---|---|
| | | | Reactant | W (F.M.) (Joule/Kg) | C (at %) | C/H | Thickness (Å) | | | |
| 101 | Al | ML1 | CH$_4$ | $5 \times 10^8$ | 67 | 2.0 | 300 | TC1 | 0 | 0.25 |
| 102 | Al | ML1 | C$_2$H$_2$ + N$_2$ | $7 \times 10^9$ | 72 (N:5) | 3.2 | 300 | TC1 | 0 | 0.27 |
| 103 | Al | ML1 | C$_2$H$_6$ | $5 \times 10^9$ | 81 | 4.2 | 300 | TC1 | 0 | 0.24 |
| 104 | Al | ML1 | CH$_4$ | $6 \times 10^5$ | 17 | 0.2 | 300 | TC1 | 8 | 0.29 |
| 105 | Al | ML1 | CH$_4$ | $5 \times 10^{10}$ | 89 | 8.5 | 300 | TC1 | 3 | 0.28 |
| 106 | Al | ML1 | CH$_4$ | $5 \times 10^8$ | 67 | 2.0 | 300 | TC2 | 0 | 0.20 |
| 107* | Al | ML1 | CH$_4$ | $5 \times 10^8$ | 67 | 2.0 | 300 | Si-Oil | 25 | 0.98 |
| 108 | Al | ML2 | CH$_4$ | $5 \times 10^8$ | 67 | 2.0 | 500 | TC1 | 0 | 0.26 |
| 109 | Al | ML3 | CH$_4$ | $5 \times 10^8$ | 67 | 2.0 | 800 | TC1 | 0 | 0.27 |
| 110 | Al | ML4 | CH$_4$ | $5 \times 10^8$ | 67 | 2.0 | 300 | TC1 | 0 | 0.27 |
| 111* | Al | ML1 | — | — | — | — | — | TC1 | >1000 | >1.0 |
| 112* | Al | ML1 | — | — | — | — | — | — | >1000 | >1.0 |
| 113* | Al | ML1 | — | — | — | — | — | TC1 | 16 | 0.35 |
| 114 | Glass | ML2 | CH$_4$ | $5 \times 10^8$ | 67 | 2.0 | 300 | TC1 | 0 | 0.28 |
| 115 | Plastics | ML2 | CH$_4$ | $5 \times 10^8$ | 67 | 2.0 | 300 | TC1 | 2 | 0.29 |

*comparison

EXAMPLE 2

The procedure of Example 1 was repeated until the plasma-polymerized film was formed on the magnetic The sputtering conditions included a sputtering power of 3 kW, an operating pressure of 1 Pa and a sample-to-target distance of 10 cm. The resin target had dimensions of about 15 cm by 30 cm. The inert gas used in the sputtering was argon.

Topcoat composition Si-Oil

Same as in Example 1.

In this way, a number of magnetic disk samples were fabricated as reported in Table 2 and measured for various properties.

(1) CSS

A contact-start-and-stop (CSS) test was carried out. The number of errors per disk recording side of a magnetic disk sample was counted both immediately after fabrication and after 30,000 contact-start-and-stop cycles. An increase of the number of errors or missing pulses before and after the CSS test was reported in bits per side.

The number of errors per disk recording side was counted using a disk certifier manufactured by Hitachi Electronic Engineering K.K. with the slicing level of missing pulses set at 65%.

(2) ΔBm

Using a vibratory specimen type magnetometer, Model VSM-5S manufactured by Toei Kogyo K.K., the saturated magnetic flux density Bm of a specimen cut to a size of 8 mm × 8 mm was measured under the maximum applied magnetic filed of 15 kilogauss. Measumrent was made both before and after the specimen was allowed to stand at 60° C. and RH 90% for one month. A change ΔBm in the saturated magnetic flux was calculated and expressed in %. That is, ΔBm=[(Bm after 1-month storage @60° C., RH90%)−(Bm as fabricated)]/(Bm as fabricated)×100%.

(3) Coefficient of friction (μ)

After a 30,000-cycle contact start-and-stop (CSS) test, the disk in contact with the head was allowed to stand at 20° C. and RH 60% for 24 hours. The surface of the disk sample was measured for coefficient of friction. The head used was an Mn-Zn ferrite head.

The results are shown in Table 2.

EXAMPLE 3

Sample Nos 101 and 102 of Example 1 and sample Nos. 201 and 202 of Example 2 were subjected to a durability test as defined below.

Durability test

A 5¼-inch magnetic disk was loaded in a disk drive which was placed in a constant-temperature chamber at 0° C. The number of errors or missing pulses was counted in bits per side both before and after a 30,000 cycle CSS test. The number of errors per disk recording side of the disk sample was counted using a disk certifier manufactured by Hitachi Electronic Engineering K.K. with the slicing level of missing pulses set at 65%. An increase of the number of errors or missing pulses before and after the test was reported in Table 3.

Additional sample Nos. 121, 122, and 123 were fabricated by replacing the plasma-polymerized film of sample Nos. 101 and 102 by the films shown in Table 3. Additional sample Nos. 221, 222, and 223 were fabricated by replacing the plasma-polymerized film of sample Nos. 201 and 202 by the films shown in Table 3. They were also tested.

TABLE 3

| Sample No. | Reactant Reactant | Plasma-polymerized film | | | | | Durability bits/side |
|---|---|---|---|---|---|---|---|
| | | W/F.M joule/kg | C at % | C/H | N at % | O at % | |
| 101 | $CH_4$ | $5 \times 10^8$ | 67 | 2.0 | — | — | 11 |
| 102 | $C_2H_2 + N_2$ | $7 \times 10^9$ | 72 | 3.2 | 5 | — | 4 |
| 121 | $CH_4 + NH_3$ | $5 \times 10^8$ | 52 | 1.6 | 16 | — | 0 |
| 122 | $CH_4 + N_2O$ | $5 \times 10^8$ | 47 | 1.7 | 20 | 5 | 0 |
| 123 | $C_2H_2 + CO_2$ | $5 \times 10^8$ | 55 | 1.8 | — | 15 | 0 |
| 201 | $CH_4$ | $5 \times 10^8$ | 67 | 2.0 | — | — | 9 |
| 202 | $C_2H_2 + N_2$ | $7 \times 10^9$ | 72 | 3.2 | 5 | — | 3 |
| 221 | $CH_4 + NH_3$ | $5 \times 10^8$ | 52 | 1.6 | 16 | — | 0 |
| 222 | $CH_4 + N_2O$ | $5 \times 10^8$ | 35 | 1.7 | 28 | 16 | 0 |
| 223 | $C_2H_2 + CO_2$ | $5 \times 10^8$ | 48 | 1.8 | — | 25 | 0 |

EXAMPLE 4

The procedure of Example 1 was repeated until the protective nonmagnetic metal film of chromium was formed on the magnetic layer. The thickness of the protective nonmagnetic metal film was 100 Å.

TABLE 2

| Sample No. | Substrate | Magnetic Layer | 1st Plasma-Polymerized Film | | | | | 2nd Plasma Polymerized Film | Topcoat | CSS | Δ Bm (%) | μ |
|---|---|---|---|---|---|---|---|---|---|---|---|---|
| | | | Reactant | W/(F.M.) (Joule/kg) | C (at %) | C/H | Thickness (Å) | | | | | |
| 201 | Al | ML1 | $CH_4$ | $5 \times 10^8$ | 67 | 2.0 | 100 | Yes | TC1 | 0 | 1.0 | 0.23 |
| 202 | Al | ML1 | $C_2H_2 + N_2$ | $7 \times 10^9$ | 72 (N:5) | 3.2 | 100 | Yes | TC1 | 0 | 1.2 | 0.21 |
| 203 | Al | ML1 | $C_2H_6$ | $5 \times 10^9$ | 81 | 4.2 | 100 | Yes | TC1 | 0 | 1.4 | 0.24 |
| 204 | Al | ML1 | $CH_4$ | $6 \times 10^5$ | 17 | 0.2 | 100 | Yes | TC1 | 7 | 3.1 | 0.34 |
| 205 | Al | ML1 | $CH_4$ | $5 \times 10^{10}$ | 89 | 8.5 | 100 | Yes | TC1 | 4 | 2.3 | 0.30 |
| 206 | Al | ML1 | $CH_4$ | $5 \times 10^8$ | 67 | 2.0 | 100 | Yes | TC22 | 0 | 1.4 | 0.23 |
| 207* | Al | ML1 | $CH_4$ | $5 \times 10^8$ | 67 | 2.0 | 100 | Yes | Si-Oil | 22 | 1.4 | 0.42 |
| 208 | Al | ML2 | $CH_4$ | $5 \times 10^8$ | 67 | 2.0 | 150 | Yes | TC1 | 0 | 1.5 | 0.22 |
| 209 | Al | ML3 | $CH_4$ | $5 \times 10^8$ | 67 | 2.0 | 200 | Yes | TC1 | 0 | 1.4 | 0.24 |
| 210 | Al | ML4 | $CH_4$ | $5 \times 10^8$ | 67 | 2.0 | 100 | Yes | TC1 | 0 | 1.8 | 0.25 |
| 211* | Al | ML1 | — | — | — | — | — | No | TC1 | 55 | 7.5 | 0.55 |
| 212* | Al | ML1 | — | — | — | — | — | No | — | 700 | 8.2 | >1.0 |
| 213 | Glass | ML2 | $CH_4$ | $5 \times 10^8$ | 67 | 2.0 | 100 | Yes | TC1 | 0 | 1.1 | 0.23 |
| 214 | Plastics | ML2 | $CH_4$ | $5 \times 10^8$ | 67 | 2.0 | 100 | Yes | TC22 | 1 | 1.2 | 0.28 |
| 215 | Al | ML1 | $CH_4$ | $5 \times 10^8$ | 67 | 2.0 | 100 | No | TC1 | 0 | 1.2 | 0.22 |
| 216 | Al | ML1 | $C_2H_6$ | $5 \times 10^9$ | 81 | 4.2 | 100 | No | TC1 | 0 | 1.7 | 0.23 |
| 217 | Al | ML1 | — | — | — | — | — | Yes | TC1 | 0 | 1.5 | 0.21 |
| 218 | Al | ML1 | — | — | — | — | — | Yes | TC1 | 0 | 1.6 | 0.24 |

*comparison

On the protective film, a protective carbon film was formed to a thickness of 300 Å by sputtering carbon under an argon pressure of 0.2 Pa with a power of DC 8 kilowatts applied.

The surface of the protective carbon film was plasma treated. Where the protective carbon film was omitted, the surface of the protective nonmagnetic metal film was plasma treated.

The plasma treatment was carried out using a treating gas of nitrogen under a pressure of 5 Pa and applying a power of 3 kilowatts at a frequency of 13.56 MHz.

A topcoat in the form of a plasma-polymerized film was formed on the plasma-treated surface by the following procedure.

The coated substrate was placed in a vacuum chamber, which was evacuated to a vacuum of $10^{-3}$ Torr and then charged with a predetermined flow rate of a gaseous reactant as reported in Table 4 so as to maintain a gas pressure of 0.05 Torr. A high frequency voltage was applied at 13.56 MHz to generate a plasma flame, with which the reactant was polymerized to form a plasma-polymerized film. Various parameters of the plasma-polymerized film is reported in Table 4. The heading (F/C)t/(F/C)b in Table 4 is the ratio of the average atom ratio of fluorine to carbon (F/C)t in the top region of the topcoat film which extends from its exposed surface to a depth of ⅓rd of its thickness to the average atom ratio of fluorine to carbon (F/C)b in the bottom region of the topcoat film which extends from its surface adjacent to the substrate to a level of ⅓rd of its thickness.

The samples were measured for the following properties.

(1) Coefficient of friction ($\mu$)

After a 20,000-cycle contact start-and-stop (CSS) test, the disk in contact with the head was allowed to stand at 20° C. and RH 60% for three days. The surface of the disk sample was measured for coefficient of friction. The head used was an Mn-Zn ferrite head.

(2) Grip

A Mn-Zn ferrite head was held on the surface of a stationary magnetic disk sample at 20° C. and RH 70% for 48 hours before the sample was suddenly rotated to measure an initial coefficient of friciton.

(3) Surface observation

At the end of the CSS test, the surface of a sample was observed under a scanning electronmicroscope.

The crazing or cracking state of the surface was evaluated in four grades.
E: No crazing
Good: Crazing only on topcoat surface
Fair: Cracks to protective film surface
Poor: Deep cracks to protective and magnetic films
The results are shown in Table 4.

TABLE 4

| Sample No. | Substrate | Magnetic Layer | C. Film | Reactant | W/(F.M.) (Joule/Kg) | C (at %) | F/C | C/H | H/F | (F/C)t (F/C)b | Contact Angle | Thickness (Å) | $\mu$ | Grip | Surface Observed |
|---|---|---|---|---|---|---|---|---|---|---|---|---|---|---|---|
| 301 | Al | ML1 | Yes | $CH_4 + C_3F_6$ | $2 \times 10^{10}$ | 47 | 0.8 | 4.1 | 0.30 | 2.1 | 118 | 80 | 0.24 | 0.13 | E |
| 302 | Al | 1 | Yes | $CH_4 + CHF_3$ | $3 \times 10^8$ | 43 | 1.0 | 3.1 | 0.32 | 2.2 | 122 | 80 | 0.23 | 0.10 | E |
| 303 | Al | 1 | Yes | $C_2H_6 + C_2F_4$ | $2 \times 10^{10}$ | 44 | 1.0 | 3.5 | 0.29 | 2.3 | 120 | 80 | 0.24 | 0.11 | E |
| 304 | Al | 1 | Yes | $C_2H_6 + C_2F_4$ | $5 \times 10^8$ | 43 | 1.0 | 2.9 | 0.34 | 2.1 | 122 | 80 | 0.22 | 0.12 | E |
| 305* | Al | 1 | Yes | $CH_4 + CHF_3$ | $8 \times 10^7$ | 22 | 0.2 | 0.3 | 16.7 | 2.0 | 92 | 80 | 0.75 | 0.28 | Fair |
| 306* | Al | 1 | Yes | $CH_4 + CHF_3$ | $4 \times 10^5$ | 22 | 3.2 | 2.5 | 0.13 | 2.0 | 124 | 80 | 0.52 | 0.23 | Fair |
| 307* | Al | 1 | Yes | $CH_4 + CHF_3$ | $5 \times 10^{15}$ | 89 | 0.1 | 41.7 | 0.24 | 2.0 | 89 | 80 | 0.66 | 0.25 | Fair |
| 308 | Al | ML2 | Yes | $CH_4 + CHF_3$ | $3 \times 10^8$ | 43 | 1.0 | 3.1 | 0.32 | 2.0 | 122 | 80 | 0.21 | 0.12 | E |
| 309 | Al | ML3 | Yes | $CH_4 + CHF_3$ | $3 \times 10^8$ | 43 | 1.0 | 3.1 | 0.32 | 2.0 | 122 | 80 | 0.22 | 0.11 | E |
| 310 | Al | ML4 | Yes | $CH_4 + CHF_3$ | $3 \times 10^8$ | 43 | 1.0 | 3.1 | 0.32 | 2.0 | 122 | 80 | 0.26 | 0.13 | E |
| 311* | Al | ML1 | Yes | — | — | — | — | — | — | — | — | — | >1 | 0.41 | Poor |
| 312* | Al | 1 | No | — | — | — | — | — | — | — | — | — | >1 | 0.62 | Poor |
| 313 | Al | 1 | Yes | $CH_4 + CHF_3$ | $3 \times 10^8$ | 43 | 1.0 | 3.1 | 0.32 | 0.5 | 110 | 80 | 0.32 | 0.21 | Fair |
| 314 | Al | 1 | Yes | $CH_4 + CHF_3$ | $3 \times 10^8$ | 43 | 1.0 | 3.1 | 0.32 | 1.0 | 121 | 80 | 0.29 | 0.18 | Good |
| 315 | Al | 1 | Yes | $CH_4 + CHF_3$ | $3 \times 10^8$ | 43 | 1.0 | 3.1 | 0.32 | 1.5 | 122 | 80 | 0.26 | 0.15 | E |
| 316 | Al | 1 | Yes | $C_3F_6$ | $7 \times 10^8$ | 48 | 1.1 | — | — | 2.0 | 122 | 80 | 0.23 | 0.10 | E |
| 317 | Glass | ML2 | Yes | $CH_4 + CHF_3$ | $3 \times 10^8$ | 43 | 1.0 | 3.1 | 0.32 | 2.2 | 122 | 80 | 0.22 | 0.10 | E |
| 318 | Plastics | ML3 | Yes | $CH_4 + CHF_3$ | $3 \times 10^8$ | 43 | 1.0 | 3.1 | 0.32 | 2.2 | 122 | 80 | 0.29 | 0.14 | Good |
| 319 | Al | ML1 | No | $CH_4 + CHF_3$ | $3 \times 10^8$ | 43 | 1.0 | 3.1 | 0.32 | 2.2 | 122 | 400 | 0.24 | 0.11 | E |
| 320 | Al | ML1 | No | $C_2H_6 + C_2F_4$ | $2 \times 10^{10}$ | 49 | 0.8 | 4.1 | 0.30 | 2.1 | 118 | 400 | 0.22 | 0.12 | E |

*comparison

EXAMPLE 5

The procedures of Example 1 were followed until the intermediate nonmagnetic metal layer of Cr was formed by sputtering. Thereafter, one of the following variety of metal thin film magnetic layers was formed contiguous to the intermediate layer. It should be noted that in case the magnetic layer be formed by electroless plating, the etching treatment of the undercoat and formation of the nonmagnetic metal (Cr) intermediate layer were omitted.

Preparation of metal thin film magnetic layer

Magnetic layer No. 51 (ML51)

A CoNi magnetic layer was formed by sputtering under an argon pressure of 2.0 Pa and DC 8 kilowatts. The CoNi composition was Co/Ni=80/20 in weight ratio. The film thickness was 600 Å.

The surface of the magnetic layer was then oxidized with a plasma under the following conditions.
Treating gas: $NO_2$
Gas flow rate: 10 SCCM (standard cubic centimeter)
Vacuum: 0.05 Torr
Power: 13.56 MHz
The oxidized magnetic layer had the following oxygen to cobalt ratios.
Average O/Co=0.1:1
(O/Co)u=0.8:1
(O/Co)l=0.01:1

It is to be noted that (O/Co)u is the ratio of O/Co in the upper region of the magnetic layer that extends from its upper or exposed surface to a depth of 1/10th of its thickness. (O/Co)l is the ratio of O/Co in the remaining lower region of the magnetic layer that extends from its lower surface adjacent to the substrate to a level of 1/10th of its thickness.

Magnetic layer No. 52 (ML52)

A CoNiCr magnetic layer was formed by sputtering under an argon pressure of 2.0 Pa and DC 8 kilowatts. The CoNiCr composition was Co/Ni/Cr=62.5/30/7.5 in weight ratio. The film thickness was 600 Å.

The surface of the magnetic layer was then oxidized with a plasma under the following conditions.
Treating gas: $O_2$
Gas flow rate: 25 SCCM
Vacuum: 0.01 Torr
Power: 2.45 GHz
The oxidized magnetic layer had the following oxygen to cobalt ratios.
Average O/Co=0.08:1
(O/Co)u=0.5:1
(O/Co)l=0.01:1

Magnetic layer No. 53 (ML53)

A CoCr magnetic layer was formed by sputtering under an argon pressure of 2.0 Pa and DC 8 kilowatts. The CoCr composition was Co/Cr=87/13 in weight ratio. The film thickness was 1000 Å.

The surface of the magnetic layer was then oxidized with a plasma under the following conditions.
Treating gas: $O_2$
Gas flow rate: 25 SCCM
Vacuum: 0.01 Torr
Power: 2.45 GHz
The oxidized magnetic layer had the following oxygen to cobalt ratios.
Average O/Co=0.15:1
(O/Co)u =1.0:1
(O/Co)l=0.008:1

Magnetic layer No. 54 (ML54)

A CoNiP magnetic layer was formed by electroless plating under conditions described below. The CoNiP composition was Co/Ni/P=6/4/1 in weight ratio. The film thickness was 1000 Å.

The steps and conditions of the electroless plating process are given below.
1) Alkaline degreasing: Alprep 204 (Okuno Seiyaku K.K.) 250 ml/l, 65° C., 5 min.
2) Acidic degreasing: Alprep 230 (Okuno Seiyaku K.K.) 150 ml/l, 65° C., 5 min.
3) Hydrochloric acid degreasing: 5 vol % HCl, 25° C., 1 min.
4) Sulfuric acid degreasing: 5 vol % $H_2SO_4$, 25° C., 1 min.
5) Nickel plating: Niclad 719A (Okuno Seiyaku K.K.) 80 ml/l + Niclad 719B (Okuno Seiyaku K.K.) 150 ml/l, pH 4.5, 90° C., 30 sec.

| 6) Cobalt plating: plating bath | mol/liter |
|---|---|
| Cobalt sulfate | 0.06 |
| Nickel sulfate | 0.04 |
| Sodium hypophosphite | 0.25 |
| Rochelle salt | 1.00 |
| Ammonium sulfate | 0.40 |
| Boric acid | 0.10 | plus NaOH, pH 9.5, 70° C., 3 min.

The surface of the magnetic layer was then oxidized with a plasma under the following conditions.
Treating gas: $O_2$
Gas flow rate: 25 SCCM
Vacuum: 0.01 Torr
Power: 2.45 GHz
The oxidized magnetic layer had the following oxygen to cobalt ratios.
Average O/Co=0.20:1
(O/Co)u =0.1:1
(O/Co)l=0.02:1

Magnetic layer No. 55 (ML55)

It was the same as magnetic layer No. 51 except that the plasma oxidation was omitted.

Magnetic layer No. 56 (ML56)

It was the same as magnetic layer No. 52 except that the plasma oxidation was omitted.

Magnetic layer No. 57 (ML57)

It was the same as magnetic layer No. 53 except that the plasma oxidation was omitted.

Magnetic layer No. 58 (ML58)

It was the same as magnetic layer No. 54 except that the plasma oxidation was omitted.

Magnetic layer Nos. 55-58 had average O/Co ratios between 0.005:1 and 0.05:1.

On each of the various metal thin film magnetic layers thus deposited was formed a protective nonmagnetic metal film of Cr. Film deposition was by sputtering chromium under an argon gas pressure of 2.0 Pa and DC 8 kilowatts. The film was 100 Å thick.

It is to be noted that only when the metal thin film magnetic layers are of magnetic layers Nos. 54 and 58 as identified above, the surfaces of the metal thin film magnetic layers were etched under an argon gas pressure of 0.2 Pa and an RF power of 400 watts immediately before the protective nonmagnetic metal film was deposited.

On the protective nonmagnetic metal film was formed a topcoat in the form of a plasma-polymerized film. The coated substrate was placed in a vacuum chamber, which was evacuated to a vacuum of $10^{-3}$ Torr and then charged with a predetermined flow rate of a gaseous reactant as reported in Table 5 so as to maintain a gas pressure of 0.05 Torr. A high frequency voltage was applied at 13.56 MHz to generate a plasma flame, with which the reactant was polymerized to form a plasma-polymerized film. Various parameters of the plasma-polymerized film is reported in Table 5. The heading (F/C)t/(F/C)b in Table 5 is the ratio of the average atom ratio of fluorine to carbon (F/C)t in the top region of the topcoat film which extends from its exposed surface to a depth of ⅓rd of its thickness to the average atom ratio of fluorine to carbon (F/C)b in the bottom region of the topcoat film which extends from its surface adjacent to the substrate to a level of ⅓rd of its thickness.

Sample No. 415 had a protective carbon film of 100 Å thick formed on the protective nonmagnetic metal film. The topcoat was formed on the carbon film.

In sample No. 417, the surface of the protective nonmagnetic metal film was plasma treated before the topcoat was formed. The plasma treating conditions were treating gas $N_2$, pressure 5 Pa, source 13.56 MHz high frequency, and power supplied 3 kilowatts.

In this way, a number of magnetic disk samples were fabricated as reported in Table 5 and measured for (1) CSS characteristics and (2) coefficient of friction ($\mu$) both by the same methods as described in Example 2. The results are shown in Table 5.

TABLE 5

| Sample No. | Substrate | Magnetic Layer | Plasma-polymerized topcoat film ||||||| Contact angle | CSS error (bits/side) | $\mu$ |
| | | | Reactant | W/F.M (Joule/Kg) | Thickness (Å) | C (at %) | F/C | H/F | (F/C)t (F/C)b | | | |
|---|---|---|---|---|---|---|---|---|---|---|---|---|
| 401 | Al | ML51 | $CF_4 + C_3F_6$ | $2 \times 10^{10}$ | 300 | 49 | 0.8 | 0.30 | 2.0 | 118 | 0 | 0.18 |
| 402* | Al | ML55 | $CF_4 + C_3F_6$ | $2 \times 10^{10}$ | 300 | 49 | 0.8 | 0.30 | 2.0 | 118 | 11 | 0.24 |
| 403 | Al | ML52 | $CH_4 + CHF_3$ | $3 \times 10^9$ | 300 | 43 | 1.0 | 0.35 | 2.2 | 120 | 0 | 0.17 |
| 404* | Al | ML56 | $CH_4 + CHF_3$ | $3 \times 10^9$ | 300 | 43 | 1.0 | 0.35 | 2.2 | 120 | 10 | 0.23 |
| 405 | Al | ML53 | $C_2H_6 + C_2F_4$ | $5 \times 10^{10}$ | 300 | 37 | 1.2 | 0.45 | 2.0 | 121 | 0 | 0.1 |
| 406* | Al | ML57 | $C_2H_6 + C_2F_4$ | $5 \times 10^{10}$ | 300 | 37 | 1.2 | 0.45 | 2.0 | 121 | 12 | 0.25 |
| 407 | Al | ML54 | $CH_4 + C_2F_4$ | $7 \times 10^8$ | 300 | 35 | 1.4 | 0.32 | 2.1 | 122 | 0 | 0.17 |
| 408* | Al | ML58 | $CH_4 + C_2F_4$ | $7 \times 10^8$ | 300 | 35 | 1.4 | 0.32 | 2.1 | 122 | 14 | 0.26 |
| 409 | Al | ML51 | $CH_4 + C_2F_4$ | $7 \times 10^7$ | 300 | 87 | 0.1 | 0.51 | 1.0 | 91 | 2 | 0.31 |
| 410 | Al | ML51 | $CH_4 + C_2F_4$ | $3 \times 10^4$ | 300 | 22 | 3.2 | 0.13 | 1.5 | 124 | 2 | 0.30 |
| 411* | Al | ML51 | — | — | — | — | — | — | — | 124 | 60 | 0.81 |
| 412* | Al | ML55 | — | — | — | — | — | — | — | 124 | 800 | >1.0 |
| 413 | Al | ML51 | $C_3F_6$ | $6 \times 10^8$ | 300 | 40 | 1.5 | — | 2.0 | 120 | 0 | 0.16 |
| 414 | Glass | ML52 | $CH_4 + CHF_3$ | $3 \times 10^9$ | 300 | 43 | 1.0 | 0.35 | 2.1 | 120 | 0 | 0.18 |
| 415 | Al | ML51 | $CH_4 + C_3F_6$ | $2 \times 10^{10}$ | 200 | 49 | 0.8 | 0.30 | 2.0 | 118 | 0 | 0. |
| 416 | Al | ML51 | $CH_4 + C_3F_6$ | $2 \times 10^{10}$ | 200 | 49 | 0.8 | 0.30 | 1.0 | 115 | 0 | 0.21 |
| 417 | Al | ML51 | $CH_4 + C_3F_6$ | $2 \times 10^{10}$ | 200 | 49 | 0.8 | 0.30 | 2.0 | 118 | 0 | 0.15 |

*comparison

EXAMPLE 6

The procedure of Example 1 was repeated until the metal thin film magnetic layer was formed. On each of the various metal thin film magnetic layers deposited by the same procedures as in Example 1 was formed a plasma-polymerized organometallic film under the plasma polymerization conditions shown below.

Plasma-polymerized organometallic film 1 (PPOM1)

Gaseous monomer: tetramethyltin
Monomer flow rate: 10 ml/min.
Carrier gas: argon
Carrier flow rate: 50 ml/min.
Vacuum: 0.5 Torr
High frequency power source: 13.56 MHz, 200 watts The polymerized film was measured to have a uniform thickness of 250 Å using the multiple interference technique and an ellipsometer. Fourier transformation infrared spectroscopy and electron spectroscopy for chemical analysis (ESCA) showed that the film is a thin polymerized film containing tin. Metal to carbon ratio (M/C)=0.35.

Plasma-polymerized organometallic film 2 (PPOM2)

A polymerizd film was deposited under the same conditions as used for polymerized film 1 except that the monomer used was titanium acetylacetonate, The film was 210 Å thick and had a M/C ratio of 0.21:1.

Plasma-polymerized organometallic film 3 (PPOM3)

A polymerizd film was deposited under the same conditions as used for polymerized film 1 except that the monomer used was dimethylmagnesium. The film was 250 Å thick and had a M/C ratio of 0.31:1.

Plasma-polymerized organometallic film 4 (PPPOM4)

A polymerizd film was deposited under the same conditions as used for polymerized film 1 except that the monomer used was phenylcopper. The film was 280 Å thick and had a M/C ratio of 0.19:1.

Plasma-polymerized organometallic film 5 (PPOM5)

A polymerizd film was deposited under the same conditions as used for polymerized film 1 except that the monomer used was dimethylzinc. The film was 200 Å thick and had a M/C ratio of 1.1:1.

Plasma-polymerized organometallic film 6 (PPOM6)

A polymerizd film was deposited under the same conditions as used for polymerized film 1 except that the monomer used was trimethylaluminum. The film was 250 Å thick and had a M/C ratio of 0.10:1.

Plasma-polymerized organometallic film 7 (PPOM7)

A polymerizd film was deposited under the same conditions as used for polymerized film 1 except that the monomer used was tetraethyltin. The film was 300 Å thick and had a M/C ratio of 0.21:1.

Plasma-polymerized organometallic film 8 (PPOM8)

A polymerizd film was deposited under the same conditions as used for polymerized film 1 except that the monomer used was phenylsilver. The film was 250 Å thick and had a M/C ratio of 0.04:1.

Plasma-polymerized organometallic film 9 (PPOM9)

For comparison purpose, a polymerizd film was deposited under the same conditions as used for polymerized film 1 except that the monomer used was ethylene $C_2H_4$. The film was 300 Å thick.

A plasma-polymerized topcoat film was formed on the plasma-polymerized organometallic film. More particularly, the coated substrate was placed in a vacuum chamber, which was evacuated to a vacuum of $10^{-3}$ Torr and then charged with a predetermined flow rate of a selected gaseous reactant so as to maintain a gas pressure of 0.05 Torr. A high frequency voltage was applied at 13.56 MHz to generate a plasma flame, with which the reactant was polymerized to form a plasma-polymerized film. The thickness of the thus formed film is reported in Table 6. The heading x in Table 6 is the ratio of the average atom ratio of fluorine or silicon to carbon (F or Si/C)t in the top region of the topcoat film which extends from its exposed surface to a depth of ⅓rd of its thickness to the average atom ratio of fluorine or silicon to carbon (F or Si/C)b in the bottom region of the topcoat film which extends from its surface adjacent to the substrate to a level of ⅓rd of its thickness, that is, (F/C)t/(F/C)b or (Si/C)t/(Si/C)b.

In this way, a number of magnetic disk samples were fabricated as reported in Table 6 and measured for various properties.

For sample No. 522, a protective carbon film was formed on the plasma-polymerized organometallic film by sputtering to a thickness of 100 Å. For sample No. 523, the surface of the magnetic layer was plasma treated before the formation of plasma-polymerized organometallic film. The plasma treating conditions were treating gas $N_2$, pressure 5 Pa, source 13.56 MHz high frequency, and power supplied 3 kilowatts.

(1) CSS

A contact-start-and-stop (CSS) test was carried out. The number of errors per disk recording side of a magnetic disk sample was counted both immediately after fabrication and after 40,000 contact-start-and-stop cycles. An increase of the number of errors or missing pulses before and after the CSS test was reported in bits per side.

The number of errors per disk recording side was counted using a disk certifier manufactured by Hitachi Electronic Engineering K.K. with the slicing level of missing pulses set at 60%.

(2) Coefficient of friction ($\mu$)

After the 40,000-cycle CSS test, the disk in contact with the head was allowed to stand at 20° C. and RH 60% for three days. The surface of the disk sample was measured for coefficient of friction. The head used was an Mn-Zn ferrite head.

(3) Surface observation

At the end of the CSS test, the surface of a sample was observed under a scanning electronmicroscope.

The crazing or cracking state of the surface was evaluated in four grades.

E: No crazing
Good: Crazing only on topcoat surface
Fair: Cracks to protective film surface
Poor: Deep cracks to protective and magnetic films The results are shown in Table 6.

TABLE 6

| Sample No. | Substrate | Magnetic Layer | PPOM Film | Reactant | Thickness (Å) | C (at %) | F/C | Si/C | x | CSS error (bits/side) | $\mu$ | Surface observed |
|---|---|---|---|---|---|---|---|---|---|---|---|---|
| 501 | Al | ML1 | PPOM1 | $CH_4 + C_2F_4$ | 150 | 45 | 1.2 | — | 2.0 | 0 | 0.21 | E |
| 502 | Al | ML1 | PPOM1 | $CH_4 + C_2F_4$ | 150 | 43 | 1.3 | — | 1.0 | 1 | 0.27 | E |
| 503 | Al | ML1 | PPOM1 | $CH_4 + C_2F_4$ | 2 | 45 | 1.2 | — | 1.0 | 5 | 0.48 | Good |
| 504 | Al | ML1 | PPOM1 | $CH_4 + C_2F_4$ | 450 | 45 | 1.2 | — | 1.0 | 0 | 0.68 | E |
| 505* | Al | ML1 | PPOM1 | $C_3H_8$ | 150 | 68 | — | — | — | 12 | 0.55 | Poor |
| 506 | Al | ML1 | PPOM2 | $CH_4 + C_2F_4$ | 150 | 45 | 1.2 | — | 2.0 | 0 | 0.20 | E |
| 507 | Al | ML1 | PPOM3 | $CH_4 + C_2F_4$ | 150 | 45 | 1.2 | — | 2.0 | 0 | 0.22 | E |
| 508 | Al | ML1 | PPOM4 | $CH_4 + C_2F_4$ | 150 | 45 | 1.2 | — | 2.0 | 0 | 0.23 | E |
| 509 | Al | ML1 | PPOM5 | $CH_4 + C_2F_4$ | 150 | 45 | 1.2 | — | 2.0 | 2 | 0.26 | Good |
| 510* | Al | ML1 | PPOM9 | $CH_4 + C_2F_4$ | 150 | 45 | 1.2 | — | 2.0 | 15 | 0.85 | Poor |
| 511* | Al | ML1 | — | $CH_4 + C_2F_4$ | 150 | 45 | 1.2 | — | 2.0 | 52 | >1.0 | Poor |
| 512 | Al | ML1 | PPOM1 | $CH_4$ + Tetramethoxy-silane | 150 | 31 | — | 2.2 | 2.0 | 0 | 0.19 | E |
| 513 | Al | ML1 | PPOM6 | $CH_4$ + Tetramethoxy-silane | 150 | 34 | — | 2.2 | 2.1 | 0 | 0.23 | E |
| 514 | Al | ML1 | PPOM7 | $CH_4$ + Tetramethoxy-Silane | 150 | 33 | — | 2.2 | 2.2 | 0 | 0.21 | E |
| 515 | Al | ML1 | PPOM8 | $CH_4$ + Tetramethoxy-silane | 150 | 31 | — | 2.2 | 1.0 | 3 | 0.28 | Good |
| 516* | Al | ML1 | PPOM9 | $CH_4$ + Tetramethoxy-silane | 150 | 31 | — | 2.2 | 1.0 | 18 | 0.81 | Poor |
| 517* | Al | ML1 | — | — | — | — | — | — | — | >100 | >1.0 | Poor |
| 518 | Al | ML2 | PPOM1 | $C_2F_6$ | 150 | 43 | 1.3 | — | 2.0 | 0 | 0.23 | E |
| 519 | Al | ML3 | PPOM1 | $C_2F_6$ | 150 | 43 | 1.3 | — | 2.0 | 0 | 0.20 | E |
| 520 | Al | ML4 | PPOM1 | $C_2F_6$ | 150 | 43 | 1.3 | — | 2.0 | 1 | 0.22 | E |
| 521 | Glass | ML2 | PPOM1 | $CH_4 + C_2F_4$ | 150 | 45 | 1.2 | — | 2.0 | 0 | 0.19 | E |
| 522 | Al | ML1 | PPOM1 | $CH_4 + C_2F_4$ | 150 | 45 | 1.2 | — | 2.0 | 0 | 0.18 | E |
| 523 | Al | ML1 | PPOM1 | $CH_4 + C_2F_4$ | 150 | 45 | 1.2 | — | 2.0 | 0 | 0.18 | E |
| 524 | Al | ML1 | PPOM1 | $CH_4 + C_2F_4$ | 150 | 25 | 2.2 | — | 1.0 | 3 | 0.30 | Good |
| 525 | Al | ML1 | PPOM1 | $CH_4 + SiH_4$ | 150 | 60 | — | 0.2 | 1.0 | 3 | 0.31 | Good |

*comparison

The data in Tables demonstrate the effectiveness of the present invention.

The foregoing description has been made in conjunction with some preferred embodiments of the present invention. Modifications and changes may be made on the preferred embodiments without departing from the scope of the present invention.

We claim:

1. A magnetic recording medium comprising:
   a nonmagnetic substrate having opposed major surfaces,
   a metal thin film magnetic layer on one major surface of the substrate,
   a plasma-polymerized film on the magnetic layer, and
   a topcoat layer having a thickness of from 3 to 300 Å comprising an organic fluorine compound in an amount of at least 50% by weight on the plasma-polymerized film,
   the plasma-polymerized film comprising carbon, hydrogen, and at least one of nitrogen and oxygen, and having a thickness of 3 to 300 Å,
   an atomic ratio of C/H of from 1:1 to 1:6, and a combined content of nitrogen and/or oxygen of 2 to 40 atoms %, wherein the plasma-polymerized film is prepared by activating a gaseous reactant into a plasma to generate active species thereof while feeding the reactant into a plasma zone with W/F.M set to $10^7$ to $10^{15}$ joule/kg wherein W is an input power applied for plasma generation, F is the flow rate of the gas reactant and M is the molecular weight of the gas reactant.

2. The magnetic recording medium of claim 1 wherein the topcoat comprises at least one member selected from carboxyperfluoropolyethers and salts and esters thereof, perfluoropolyethers, and tetrafluoroethylene polymers, and a mixture thereof.

3. The magnetic recording medium of claim 1 wherein the surface of the magnetic layer is plasma treated.

4. The magnetic recording medium of claim 1 wherein the metal thin film magnetic layer predominantly comprises cobalt and at least one optional member selected from the group consisting of Ni, Cr, and P.

5. The magnetic recording medium of claim 4 wherein the metal thin film magnetic layer further comprises oxygen.

6. The magnetic recording medium of claim 1 which further comprises an undercoat layer between the substrate and the metal thin film magnetic layer.

7. The magnetic recording medium of claim 1 or 6 which further comprises an intermediate layer of a nonmagnetic metal disposed contiguous to the surface of the metal thin film magnetic layer on the side of the substrate.

8. The magnetic recording medium of claim 1 which further comprises a protective layer of a nonmagnetic metal between the metal thin film magnetic layer and the plasma-polymerized film.

9. The magnetic recording medium of claim 8 wherein the surface of the protective nonmagnetic metal layer is plasma treated.

10. The magnetic recording medium of claim 6 wherein the undercoat layer has an irregular surface.

11. The magnetic recording medium of claim 1 wherein the substrate is a rigid nonmagnetic substrate.

12. The magnetic recording medium of claim 1 which further comprises a protective carbon film between the plasma-polymerized film and the topcoat layer.

13. The magnetic recording medium of claim 1 which further comprises a protective carbon film between the metal thin film magnetic layer and the plasma-polymerized film.

14. The magnetic recording medium of claim 1 wherein a first plasma-polymerized film is on the metal thin film magnetic layer, a protective carbon film is on the first plasma-polymerized film, and a second plasma-polymerized film is on the protective carbon film.

* * * * *